United States Patent
Zhang et al.

(10) Patent No.: US 11,689,893 B2
(45) Date of Patent: Jun. 27, 2023

(54) FEEDBACK FOR MULTICAST TRANSMISSIONS WHILE IN AN INACTIVE OR IDLE MODE

(71) Applicant: QUALCOMM Incorporated, San Diego, CA (US)

(72) Inventors: Xiaoxia Zhang, San Diego, CA (US); Ayan Sengupta, San Diego, CA (US); Le Liu, Fremont, CA (US); Alberto Rico Alvarino, San Diego, CA (US); Peter Gaal, San Diego, CA (US); Juan Montojo, San Diego, CA (US); Tao Luo, San Diego, CA (US); Mostafa Khoshnevisan, San Diego, CA (US); Kazuki Takeda, Tokyo (JP)

(73) Assignee: QUALCOMM INCORPORATED, San Diego, CA (US)

( * ) Notice: Subject to any disclaimer, the term of this patent is extended or adjusted under 35 U.S.C. 154(b) by 157 days.

(21) Appl. No.: 17/223,567

(22) Filed: Apr. 6, 2021

(65) Prior Publication Data

US 2021/0321226 A1    Oct. 14, 2021

Related U.S. Application Data

(60) Provisional application No. 63/006,836, filed on Apr. 8, 2020.

(51) Int. Cl.
*H04W 4/06* (2009.01)
*H04W 72/04* (2023.01)
(Continued)

(52) U.S. Cl.
CPC ............ *H04W 4/06* (2013.01); *H04W 72/04* (2013.01); *H04W 72/21* (2023.01); *H04W 74/0833* (2013.01); *H04L 12/189* (2013.01)

(58) Field of Classification Search
CPC ... H04W 72/04; H04W 72/0406; H04W 4/06; H04W 74/0833; H04W 72/0413;
(Continued)

(56) References Cited

U.S. PATENT DOCUMENTS 11,490,313 B2 * 11/2022 Isaksson ............... H04W 36/30
2018/0115430 A1 * 4/2018 Seo ........................... H04L 1/12
(Continued)

OTHER PUBLICATIONS

International Search Report and Written Opinion—PCT/US2021/026128—ISA/EPO—dated Jul. 26, 2021.

*Primary Examiner* — Brian D Nguyen
(74) *Attorney, Agent, or Firm* — Holland & Hart LLP

(57) ABSTRACT

Methods, systems, and devices for multicast wireless communications are described. A base station may configure a user equipment (UE) for providing feedback for multicast transmissions from the base station while the UE is in an inactive or idle mode. Based on a configuration sent to the UE from the base station, the UE may determine resources or a timing advance (TA) to use for transmission of a feedback message for multicast communications. A base station may configure a UE with multiple TA commands, each corresponding to a TA value and a set of channel metrics associated with group of cells including a serving cell of the UE. Based on measure channel metrics at the UE, the UE may determine a TA to use for multicast feedback. TA values may be determined using neural network modeling.

28 Claims, 23 Drawing Sheets

(51) Int. Cl.
*H04W 74/08* (2009.01)
*H04W 72/21* (2023.01)
*H04L 12/18* (2006.01)

(58) Field of Classification Search
CPC ... H04L 1/1864; H04L 1/1861; H04L 12/189; H04L 2001/0093; H04B 7/0456; H04B 7/0695
See application file for complete search history.

(56) References Cited

U.S. PATENT DOCUMENTS

| | | | |
|---|---|---|---|
| 2019/0274131 A1* | 9/2019 | Yamazaki | H04W 72/0413 |
| 2022/0201528 A1* | 6/2022 | Shin | H04W 24/10 |
| 2022/0230141 A1* | 7/2022 | Randles | G06Q 10/103 |
| 2022/0312406 A1* | 9/2022 | Kim | H04L 5/0053 |
| 2022/0316435 A1* | 10/2022 | Suzuki | F02P 17/12 |

* cited by examiner

FEEDBACK FOR MULTICAST TRANSMISSIONS WHILE IN AN INACTIVE OR IDLE MODE

CROSS REFERENCE

The present Application for Patent claims the benefit of U.S. Provisional Patent Application No. 63/006,836 by ZHANG et al., entitled "FEEDBACK FOR MULTICAST TRANSMISSIONS WHILE IN AN INACTIVE OR IDLE MODE," filed Apr. 8, 2020, assigned to the assignee hereof, and expressly incorporated by reference herein.

TECHNICAL FIELD

The following relates generally to wireless communications, and more specifically, to feedback for multicast transmissions.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, after receiving a message from a base station, a UE may transmit feedback to the base station indicating whether the message was successfully received. For example, a base station may transmit a multicast message to one or more UEs, such as a group of UEs, served by the base station, and a UE in the group may transmit feedback for the multicast message in accordance with a timing advance (TA) associated with each of the UEs. UEs in an inactive or idle mode, however, may not have valid TAs, and may therefore refrain from transmitting feedback or may transition to a connected mode to obtain a valid TA before transmitting feedback. Refraining from transmitting feedback or transitioning to a connected mode may result in increased latency, wasted UE resources (such as power or battery life, among other examples), or inefficient use of network resources, among other issues.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method includes receiving, from a base station, one or more configurations for the UE to use, while in an inactive mode or an idle mode, to provide feedback associated with multicast transmissions from the base station, monitoring, by the UE while in the inactive mode or the idle mode, a set of time frequency resources configured for multicast transmissions from the base station, and transmitting, by the UE while in the inactive mode or the idle mode, one or more multicast feedback messages in accordance with the one or more configurations based on the monitoring.

Another innovative aspect of the subject matter described in this disclosure can be implemented in a wireless communication device. The wireless communication device includes a processor, memory coupled with the processor, and instructions stored in the memory and executable by the processor to cause the apparatus to: receive, from a base station, one or more configurations for the UE to use, while in an inactive mode or an idle mode, to provide feedback associated with multicast transmissions from the base station, monitor, by the UE while in the inactive mode or the idle mode, a set of time frequency resources configured for multicast transmissions from the base station, and transmit, by the UE while in the inactive mode or the idle mode, one or more multicast feedback messages in accordance with the one or more configurations based on the monitoring.

In some implementations, the methods and wireless communication devices may be configured to determine a set of random access channel resources available for multicast feedback based at least in part on a resource allocation indicated by the one or more configurations, wherein transmitting the one or more multicast feedback messages comprises transmitting the one or more multicast feedback messages via the set of random access channel resources.

In some implementations, the methods and wireless communication devices may be configured to determine a set of random access channel preambles available for multicast feedback based at least in part on a resource allocation indicated by the one or more configurations, and select a preamble of the set of random access channel preambles, wherein transmitting the one or more multicast feedback messages comprises transmitting the one or more multicast feedback messages using the selected preamble.

Another innovative aspect of the subject matter described in this disclosure can be implemented in a method for wireless communications at a base station. The method includes transmitting, to a UE, one or more configurations for multicast feedback for use by the UE while in an inactive mode or an idle mode, transmitting one or more multicast transmissions via a set of time frequency resources configured for multicast communications; and monitoring, based on transmitting the one or more multicast transmissions, for one or more multicast feedback messages from the UE in accordance with the one or more configurations.

Another innovative aspect of the subject matter described in this disclosure can be implemented in a wireless communication device. The wireless communication device includes a processor, memory coupled with the processor, and instructions stored in the memory and executable by the processor to cause the apparatus to: transmit, to a UE, one or more configurations for multicast feedback by the UE in an inactive mode or an idle mode, transmit one or more multicast transmissions via a set of time frequency resources configured for multicast communications, and monitor, based on transmitting the one or more multicast transmissions, for one or more multicast feedback messages from the UE in accordance with the one or more configurations.

In some implementations, the methods and wireless communication devices may be configured to transmit an indication of a set of random access channel resources available for multicast feedback in the one or more configurations, and monitor the set of random access channel resources for the one or more multicast feedback messages.

In some implementations, the methods and wireless communication devices may be configured to transmit an indication of a set of random access channel preambles available for multicast feedback in the one or more configurations, and monitor for the one or more multicast feedback messages based on the set of random access channel preambles.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

DETAILED DESCRIPTION

Figure 1:
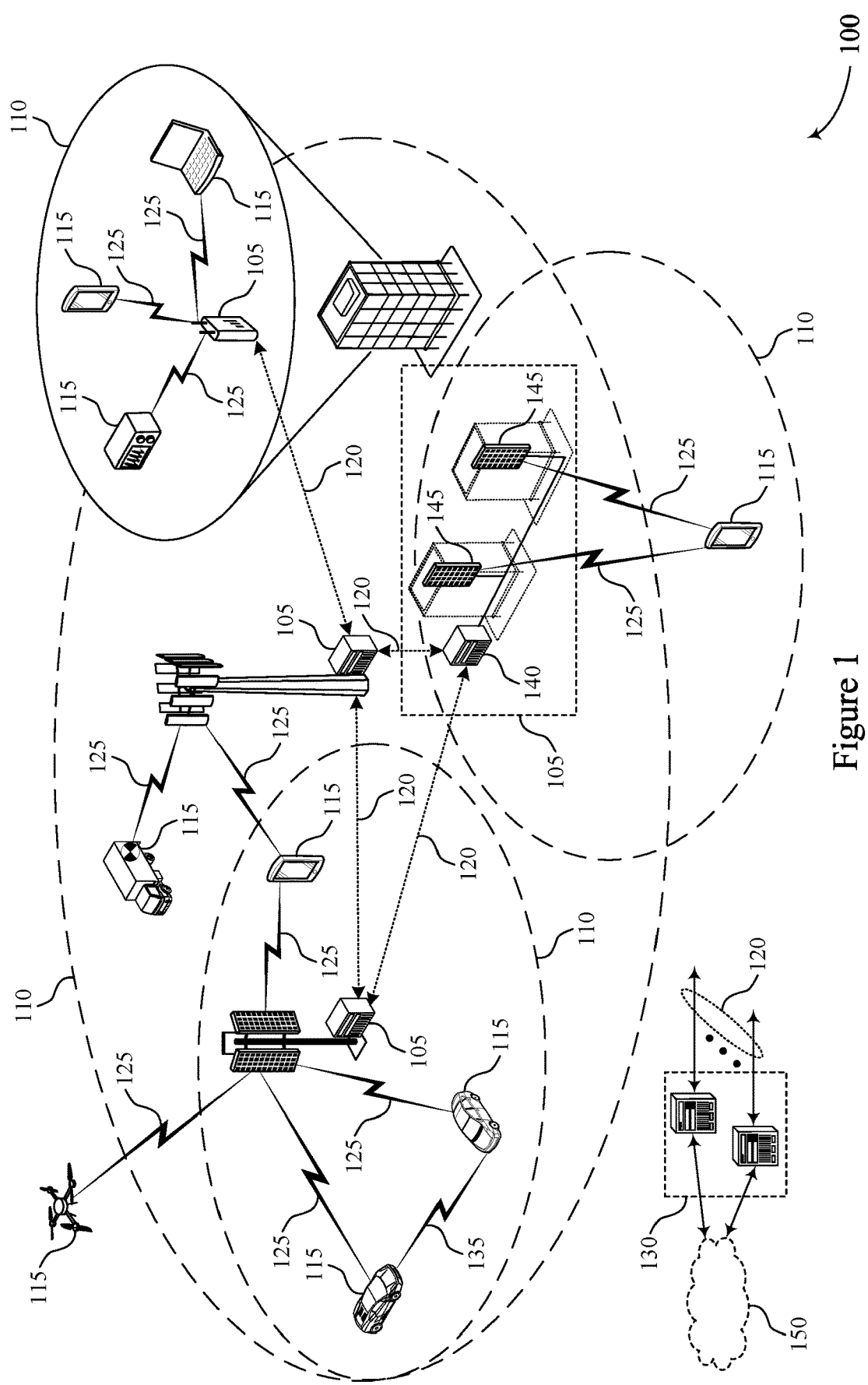
FIGS. 1-4 show wireless communications systems that support feedback for multicast transmissions in accordance with aspects of the present disclosure.

In some wireless communications systems, a device such as a user equipment (UE) or a base station may support feedback messaging, such as hybrid automatic repeat request (HARQ) feedback messaging for multicast communications. A base station may configure resources for multicast feedback, and a UE may transmit a feedback message (such as an acknowledgement (ACK) feedback message or a negative ACK (NACK) feedback message) to the base station using the configured resources. For example, a base station may transmit a multicast message to a group of UEs. A UE in the group may fail to receive the multicast message and, based on the failure, the UE may transmit a NACK feedback message to the base station for a retransmission of the multicast message. To reduce channel overhead, the resources available for multicast feedback may be shared among multiple UEs, such as all the UEs in the group, and the resources may be referred to as shared resources. Each of the multiple UEs in the group may use the resources (for example, shared physical uplink control channel (PUCCH) resources) to transmit a respective feedback message for the multicast message to the base station.

A base station may configure a timing advance (TA) for a UE in an active mode, such as in a radio resource control (RRC) connected mode, and the UE may transmit feedback for multicast messages using the TA. For example, the base station may configure the TA for the UE after the UE enters the active mode and establishes a connection with the base station, and the UE may use the TA to transmit, to the base station, a feedback message in response to a multicast message from the base station. In some aspects, the base station may transmit the multicast message to a group of UEs including the UE. The UEs in the group that are in an inactive mode (such as an RRC inactive mode) or an idle mode (such as an RRC idle mode) may monitor for the multicast message, but because the UEs are in the inactive mode or the idle mode, the UEs may not have a valid or accurate TA to use for transmitting the feedback message in response to the multicast message. To transmit a feedback message, each UE in the inactive mode or the idle mode may enter a connected mode to establish a connection with the base station and obtain a TA, which may increase overhead or use power resources at the UE and increase the latency associated with transmission of the feedback message and reception of any subsequent transmissions such as a retransmission of the multicast message in the case of NACK feedback. Further, some UEs in inactive or idle mode may refrain from transmitting the feedback message for the multicast message. In such examples, even if multiple UEs in the inactive mode or the idle mode fail to successfully decode the multicast message, the base station may not perform retransmission of the multicast message because the base station may not receive any feedback messages from the multiple UEs.

Various aspects generally relate to feedback, and more specifically, to techniques for UEs in an inactive mode or an idle mode to transmit feedback for multicast messages. Such techniques may include a base station transmitting a configuration to a UE to configure the UE for transmitting feedback for multicast messages while the UE is in the inactive mode or the idle mode. The configuration may indicate resources (such as random access channel (RACH) resources or PUCCH resources) or RACH preambles, among other information, for the UE. The base station may transmit a multicast message to the UE in the inactive mode or the idle mode, and the UE may use the indicated resources to transmit feedback for the multicast message. For example, a UE operating in the inactive mode or the idle mode may determine a RACH preamble from multiple RACH preambles or a set of resources from the RACH resources, the PUCCH resources, or a resource pool available for feedback, and may use the determined resources to transmit feedback using the determined RACH preamble.

Additionally, or alternatively, a base station may transmit a TA command to a UE or a group of UEs. The TA command may indicate a TA for the UE or a group of UEs to use, and the TA may be based on channel metrics, channel conditions, or other factors associated with the UE or the group of UEs. In some implementations, the base station may transmit multiple TA commands, and each TA command may indicate a TA that corresponds to a respective set of channel metrics for a serving cell of the UE or the group of UEs or for one or more neighboring cells. The base station may determine TA values using various techniques, such as neural network modeling (which may include the use of historical or current data), environmental conditions, or information from neighboring cell(s), among other information.

The base station may transmit multiple multicast control channels, which may be associated with various multicast services, to the UE, and the UE may successfully decode a quantity of the multicast control channels over a given duration (such as over a set of time occasions allocated for multicast communications). The UE may transmit a reception status report indicating the quantity of successfully decoded multicast control channels. In such implementations, to determine the number of UEs that have successfully or unsuccessfully decoded the multicast control channels, a base station may determine the UEs (including active, idle, and inactive UEs) that are monitoring for a given multicast service over a duration, which may be referred to herein as a counting duration. To limit the number of UEs transmitting reception status reports during the counting duration, a base station may configure some or all UEs that the base station serves with a probability indicator that corresponds to a probability of the UE transmitting feedback for the multicast message during the counting duration.

Particular implementations of the subject matter described in this disclosure may be implemented to realize one or more of the following potential advantages. In some implementations, a base station may use the described techniques to configure UEs in an inactive or idle mode for the transmission of feedback messages for multicast messages. Such techniques may enable the base station use feedback from inactive UEs or idle UEs to determine whether to retransmit multicast messages. Such techniques may also enable inactive UEs or idle UEs to transmit feedback messages for multicast messages without a configured TA or without having to enter a connected mode, which may reduce overhead and latency, improve UE performance, and increase battery life, among other advantages.

Various aspects generally relate to wireless communications systems, and more specifically to feedback for multicast transmissions. Aspects of the disclosure are described with respect to process flows. Aspects of the disclosure are also illustrated by and described with reference to apparatus diagrams, system diagrams, and flowcharts that relate to feedback for multicast transmissions.

FIG. 1 illustrates an example of a wireless communications system 100 that supports feedback for multicast transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology. The "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR).

Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel quantity (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in which a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame quantity (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the quantity of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a quantity of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (for example, control channel elements (CCEs)) associated with encoded information for a control information format having a given payload size. Search space sets may include common search space sets configured for transmitting control information to multiple UEs 115 and UE-specific search space sets for transmitting control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

Wireless communications system 100 may support multicast communications. A base station 105 may transmit a multicast message to a group of UEs 115, and the UEs 115 may monitor time-frequency resources over which the multicast message is transmitted to attempt to decode the multicast message. The UE 115 may successfully or unsuccessfully decode the multicast message, and may then transmit feedback to the base station 105. The base station 105 may configure a TA for the UE 115, and a UE 115 in an active mode, such as in an RRC connected mode, may transmit feedback using the TA. The base station 105 may configure the TA for the UE 115 once the UE enters the active mode and establishes a connection with the base station 105. In some cases, some UEs 115 may operate in an inactive or idle mode, and may not have an active connection to the base station 105. These inactive or idle UEs 115 may not have a valid TA to use for transmitting messages such as feedback. An inactive or idle UE 115 may transition to a connected mode in order to obtain a TA before transmitting a message, which may introduce latency and increase power consumed by the UE 115.

In some aspects, a UE 115 in an inactive mode or an idle mode may transmit feedback for multicast communications without transitioning to a connected state. For example, a UE 115 in an inactive or idle mode may determine resources, such as RACH resources or PUCCH resources, that are available for use by the UE 115 or a group of UEs 115 to transmit feedback while in the inactive or idle mode. The base station 105 may transmit a configuration to the UEs 115 to convey or indicate to the UEs 115 the resources available for transmitting multicast feedback.

In some implementations, the base station 105 may transmit a TA command to the UEs 115 for use while in an inactive mode or idle mode. In some other implementations, the base station 105 may transmit a set of TA commands to each UE 115. Each TA command may correspond to a respective TA value and a set of channel metrics of one or more cells such as a serving cell for the UE 115 and one or more neighboring cells of the UE 115. The UE 115 may transmit a feedback message using the TA value corresponding to the TA command associated with the set of channel metrics of the cells to provide feedback for the multicast message. In some cases, the UE 115 may measure channel metrics at the UE 115, and may use the TA value corresponding to the measured channel metrics. In some examples, the base station 105 or multiple base stations 105 may perform neural network modeling on various parameters, and the UE 115 may use the modeling to determine possible TA values for the TA commands.

In some aspects, a UE 115 may successfully receive a quantity of physical control channels for multicast communications (such as a physical downlink control channel (PDCCH) or other type of physical layer control channel for multicast communications), and a base station 105 may request status reports from the UEs 115 indicating the quantity of physical control channels. The base station 105 may provide the UE 115 with a resource pool including time and frequency resources, and the UE 115 may use the resource pool to transmit the status reports. In such cases, if a report indicates that the quantity of physical control channels for multicast communications decoded successfully is less than the quantity of transmitted physical control channels, the base station 105 may initiate a retransmission of one or more physical control channels for the multicast communications.

Figure 2:
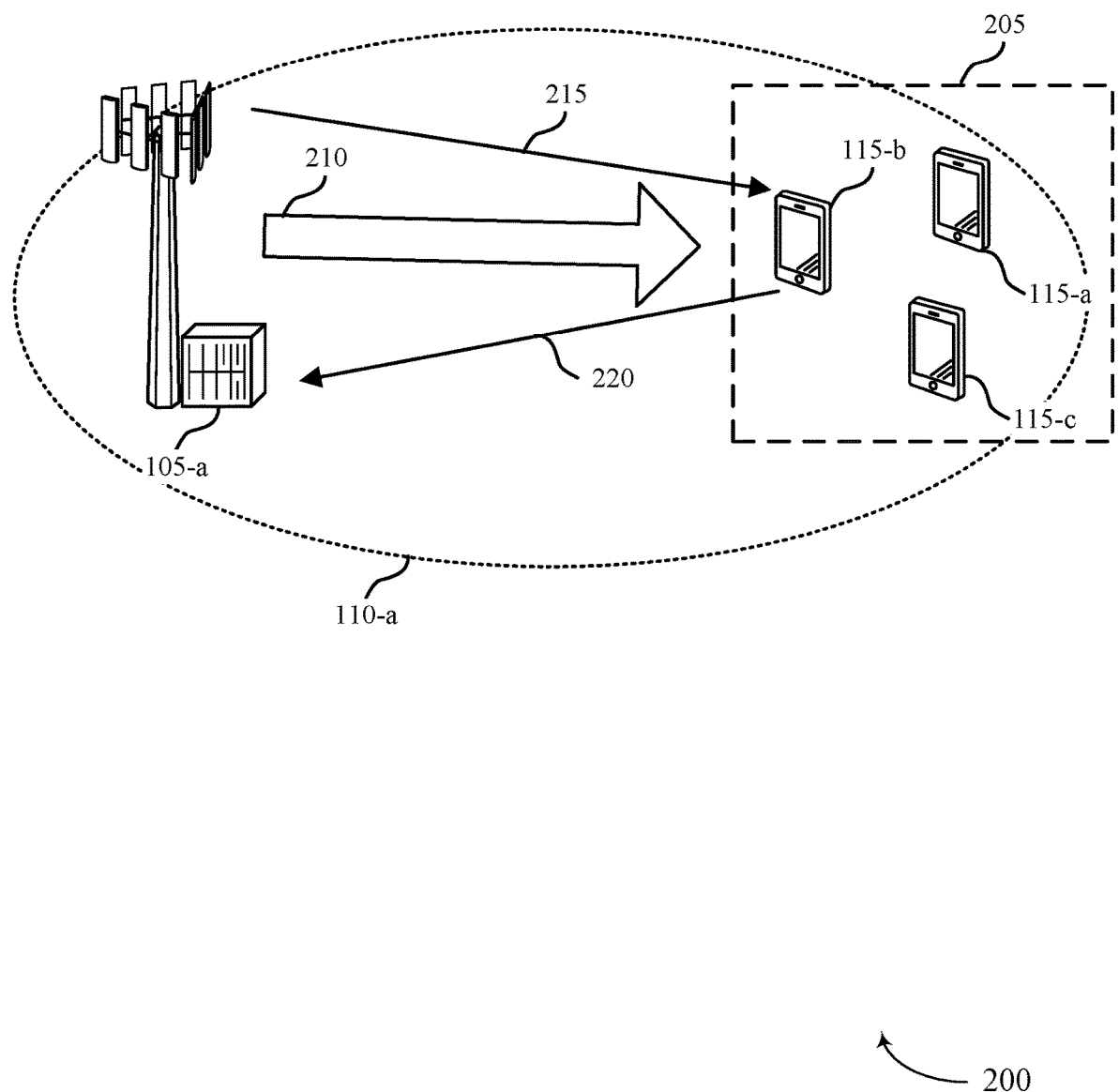

FIG. 2 shows a wireless communications system 200 that supports feedback for multicast transmissions in accordance with aspects of the present disclosure. In some examples, the wireless communications system 200 may implement aspects of wireless communications system 100. The wireless communications system 200 may include UEs 115 and a base station 105-a, which may be respective examples of the UEs 115 and a base station 105 as described with reference to FIG. 1.

One or more UEs 115 (for example, UE 115-a and UE 115-c) of a UE group 205 may be in an active or connected mode (such as an RRC connected mode), in which the UE 115 and the base station 105-a are in active communication and have an established RRC connection. Other UEs, for example, UE 115-b, of the UE group 205 may be in an inactive mode (such as RRC inactive mode), in which the UE 115-b may maintain an RRC connection with the base station 105-a but is inactive and minimizes signaling and power consumption. In some other examples, some UEs 115 in the UE group 205, such as the UE 115-b, may be in an idle mode (such as an RRC idle mode), in which the UE 115-b does not have an established RRC connection with the base station 105-a.

The wireless communications system 200 may support multicast communications between the base station 105-a and one or more UEs 115, such as the UE 115-a, the UE 115-b, and the UE 115-c within the UE group 205. For instance, the base station 105-a may transmit one or more multicast communications 210 to the UE group 205. The base station 105-a may configure some UEs 115 of UE group 205 to transmit feedback for the multicast communications to the base station 105-a. For example, a UE 115 may successfully decode a transmission and may transmit a respective ACK feedback message indicating a successful decoding, or a UE 115 may fail to successfully decode a transmission and may transmit a respective NACK feedback message indicating the failed decoding.

In some examples, the UE 115-a may operate in a connected mode, and the UE 115-a may have a valid TA useable for uplink communications between the UE 115-a and the base station 105-a. The TA may enable the UE 115-a to adjust the timing of an uplink transmission, such as a multicast feedback message, to align with the timing of the base station 105-a. The base station 105-a may expect the uplink transmission to arrive during an expected duration, and the UE 115-a may adjust the timing of the uplink transmission so that the uplink transmission arrives at the base station 105-*a* during the expected duration. In some cases, other UEs 115, such as the UE 115-*b*, operating in an inactive mode or an idle mode, may not have a valid TA. To obtain a valid TA, the UE 115-*b* may transition to a connected mode with the base station 105-*a*, which takes time and utilizes limited UE resources such as power, among other issues. Without a valid TA, the UE 115-*b* may misalign transmissions from the UE 115-*b* with the expected timing at the base station 105-*a*. This may cause the base station 105-*a* to not detect uplink transmissions from the UE 115-*b* due to the invalid TA (or lack of a TA). The base station 105-*a* may monitor a time window, and an uplink transmission from the UE 115-*a* may arrive before or after the time window. Additionally, or alternatively, the uplink transmissions from the UE 115-*b* may interfere with other uplink transmissions (such as transmission from other UEs 115) sent to the base station 105-*a*.

As described above, aspects of the present disclosure enable UEs 115 in an idle mode or an inactive mode, such as the UE 115-*b*, to transmit feedback for multicast communications while in the idle mode or inactive mode, that is, without requiring the UEs 115 to transition to a connected mode, which may reduce power consumption. Additionally, or alternatively, the base station 105-*a* may support various multicast services, and enabling multicast feedback transmission while in an idle mode or an inactive mode may enable the UEs 115, such as the UE 115-*b*, to receive or otherwise participate in the various multicast services without necessitating a switch to the connected mode.

To support multicast feedback from UEs 115 in an inactive or idle mode, the base station 105-*b* may transmit a feedback configuration message 215 to the UEs 115, including the UE 115-*b*, which the UEs 115 may use for transmitting feedback (such as feedback message 220) for multicast communication 210 while the UEs 115, including UE 115-*b*, are in the inactive mode or the idle mode. The feedback configuration message 215 may include an indication of resources (including time resources, frequency resources, or spatial resources) for the one or more UEs 115, including the UE 115-*b*, to use to transmit multicast feedback. For example, the feedback configuration message 215 may indicate, to the UE 115-*b*, time and frequency resources usable by the UE 115-*b* to transmit the feedback message 220 based on whether the UE 115-*b* successfully receives the multicast communication 210. In some examples, the base station 105-*a* may transmit the feedback configuration message 215 to the UE 115-*b* via a system information block (SIB) or a multicast control channel (MCCH), among other options.

In some examples, the feedback configuration message 215 may indicate RACH resources or RACH preambles available for the UE 115-*b* to transmit the feedback message 220. For example, the base station 105-*a* may indicate one or more physical RACH (PRACH) preambles, and the UE 115-*b* may select one of the PRACH preambles and transmit the feedback message 220 using a waveform corresponding to the selected PRACH preamble. The availability of PRACH resources or PRACH preambles may enable the UEs 115, including the UE 115-*b*, without a valid TA to transmit feedback for multicast communications including the feedback message 220. In some examples, PRACH preambles may utilize a longer cyclic prefix or guard time to account for timing uncertainty and potential interference to other UEs 115 in the system (for example, UE 115-*a* and UE 115-*c*).

In some implementations, the base station 105-*a* may allocate a pool of PRACH resources or PRACH preambles for the UEs 115 for use by UEs 115 in the inactive mode or idle mode, such as the UE 115-*b*, to transmit multicast feedback messages such as the feedback message 220. The UE 115-*b* may report channel metrics, such as reference signal received power (RSRP) thresholds, angular directions (such as altitude and azimuth values associated with one or more beams), beam directions, beam widths, or geographical locations, among other examples, and the base station 105-*a* may allocate the pool of PRACH resources or PRACH preambles based on the channel metrics. In various implementations, one or more UEs, including UE 115-*b*, may use a service, and the base station 105-*a* may allocate the pool of PRACH resources or PRACH preambles based on the service. For example, the base station 105-*a* may allocate a first set of resources or preambles for UEs 115 using a first service, and may allocate a second set of resources or preambles for UEs 115 with a specified RSRP value. The UE 115-*b* may be able to determine (for example, based on the reported channel metrics or the service used) a subset of PRACH resources or PRACH preambles of the feedback resource pool to transmit the feedback message 220. In some other implementations, the base station 105-*a* may configure additional RACH occasions for the UE 115-*b* to transmit the feedback message 220.

The base station 105-*a* may use information about the allocation of the resource pool to more efficiently transmit retransmissions to the UEs 115. For example, if a set of resources or preambles is allocated for use by the UE 115-*b* when using a first beam different than the beam originally used to transmit the multicast communication 210, and the base station 105-*a* receives the feedback message 220 from the UE 115-*b* on the set of resources associated with the first beam, the base station 105-*a* may transmit a retransmission of the multicast message using the first beam as opposed to the beam originally used. As an additional example, if the base station 105-*a* receives a NACK in the feedback message 220 on a resource corresponding to a relatively low RSRP value, the base station 105-*a* may transmit the retransmission with increased power to account for the low RSRP.

In some implementations, the base station 105-*a* may transmit an indication of PUCCH resources allocated for one or more UEs 115, including the UE 115-*b*, that may not have a valid TA (such as because they are operating in an inactive or idle mode) to transmit multicast feedback such as the feedback message 220. The base station 105-*a* may measure energy levels on the allocated PUCCH resources to determine whether a feedback message 220 is present. For example, the base station 105-*a* may receive a message on the designated PUCCH resources and may determine if the message exceeds an energy threshold. If so, the base station 105-*a* may determine that a feedback message 220 has been transmitted on the resources. The UE 115-*b* may determine a PUCCH format for the feedback message 220, which may be a PUCCH format without user multiplexing (for example, format 0, format 1, format 2, or format 3) to enable the base station 105-*a* to use energy detection. The UE 115-*b* may use other formats by allocating one code division multiplexing (CDM) resource (for example, without invoking multiplexing). The base station 105-*a* may add one or more guard duration resource elements to the time domain, the frequency domain, or both, to minimize interference from the feedback message 220 with other uplink transmissions. In some examples, the UE 115-*b* may determine the PUCCH format and may pad the payload of a feedback message 220 accordingly. For example, if the UE 115-*b* uses a PUCCH format other than format 0 or format 1 and has a single bit payload to transmit, the UE 115-*b* may pad the feedback message 220 with one or more bits, such as up to three bits, to use PUCCH format 2, PUCCH format 3, or PUCCH format 4.

In some cases, the UE 115-*b* may not transmit a feedback message 220 to the base station 105-*a*, and the base station 105-*a* may not have information about the reason for the lack of feedback. In some examples, the base station 105-*a* may configure the UEs 115, including the UE 115-*b*, to transmit NACK messages and not ACK messages, and may therefore refrain from transmitting a feedback message 220 that includes a NACK in response to successfully decoding a physical control channel for a multicast communications and a corresponding multicast message of the multicast communication 210. In some examples, the UE 115-*b* may also refrain from transmitting a feedback message 220 that includes a NACK after failing to decode a control message. For example, if the UE 115-*b* fails to successfully decode the control message, the UE 115-*b* may not expect the corresponding multicast message that the control message scheduled. As such, the UE 115-*b* may not monitor for the multicast message and may not transmit NACK feedback. As a result, the base station 105-*a* may not be aware that the UE 115-*b* failed to decode the multicast communication 210, and accordingly, may determine to not perform a retransmission despite the UE 115-*b* having not successfully decoded the multicast communication 210.

The UEs 115 may successfully decide a multicast communications and the base station 105-*a* may not receive NACK feedback, or the one or more UEs 115 may fail to successfully decode the multicast communications and the base station 105-*a* may not receive NACK feedback. To enable the base station 105-*a* to differentiate between these cases, the base station 105-*a* may provide the UEs 115, including the UE 115-*b*, with a resource pool including time and frequency resources that the UEs 115 may use to transmit reception status reports. For example, the base station 105-*a* may allocate a resource pool to the UE 115-*b* and the UE 115-*b* may transmit a message using at least a subset of the resources in the resource pool to indicate a quantity of physical control channels for multicast communications successfully decoded by the UE 115-*b*. In some implementations, the resource pool may include or consist of one or both of a set of PRACH resources or a set of PUCCH resources. Further, the base station 105-*a* may configure the UE 115-*b* to monitor one or more multicast time occasions and may transmit, to the base station 105-*a*, an indication of the number of physical control channels for multicast communications that have been successfully decoded during the one or more time occasions. For example, the UE 115-*b* may receive, from the base station 105-*a*, a multicast grant that schedules a quantity of multicast time occasions for the UE 115-*b*, over which a base station 105-*a* may choose to transmit multicast messages. The UE 115-*b* may monitor the multicast time occasions and may receive, from the base station 105-*a*, a quantity of physical control channels for multicast communications during one or more of the scheduled multicast time occasions. For example, the UE 115-*b* may receive one or more of the physical control channels, or in some cases the UE 115-*b* may not receive any physical control channels. The UE 115-*b* may select resources from the allocated resource pool, and may then transmit, using the resources, an indication of the quantity of transmissions that have been successfully decoded. Based on the indication, the base station 105-*a* may compare the number of physical control channels transmitted to the UE 115-*b* with the number of physical control channels that the UE 115-*b* has indicated as successfully decoded. If a report from the UE 115-*b* indicates that the quantity of physical control channels successfully decoded is less than the quantity of those transmitted by the base station 105-*a*, the base station 105-*a* may determine that a lack of NACK(s) from the UE 115-*b* is a result of the UE 115-*b* failing to decode one or more of the physical control channels for multicast communications, which may trigger the base station 105-*a* to initiate a retransmission.

In some implementations, the base station 105-*a* may configure the UE 115-*b* with a given resource pool based on the quantity of physical control channels of each reception status report. For example, the UE 115-*b* may decode the quantity of physical control channels, and the base station 105-*a* may select a first resource pool if a metric based on the quantity of physical control channels out of the total quantity of transmitted physical control channels satisfies a threshold (for example, if a ratio of the quantity of decoded physical control channels to the total quantity of transmitted physical control channels is greater than a threshold). Similarly, the base station 105-*a* may select a second resource pool if the metric fails to satisfy a threshold (for example, if the ratio of the quantity of decoded physical control channels to the total quantity of transmitted physical control channels is less than a threshold). Each resource pool may correspond to different multicast resources (time or frequency resources), services, or channel types, among other examples.

Typically, the probability that the base station 105-*a* receives at least one NACK after a multicast communication increases (in some cases non-linearly) with the number of UEs 115 seeking to receive the multicast communication. As such, the base station 105-*a* may count or otherwise determine or estimate the quantity of UEs 115 in the inactive mode or the idle mode presently accepting multicast communications (for example, the quantity of inactive or idle UEs 115 in UE group 205). By knowing the number of UEs 115 in the inactive or idle mode, the base station 105-*a* may make better use of any multicast feedback.

In some examples, the base station 105-*a* may perform multicast communications for different services (for example, MBMS, enhanced MBMS, among others). However, not all UEs 115 may have the capability to receive all services. For example, a UE 115-*b* may support a service while in a connected mode, but may not support the same service while in an inactive or idle mode. In some aspects, the base station 105-*a* may broadcast a counting duration for each offered multicast service and an indication of a resource pool (for example, including PUCCH or PRACH resources) on which to transmit a response. The base station 105-*a* may then count the number of UEs 115 in inactive or idle mode that are accepting multicast communications of a given service via the broadcast. During each counting duration, a UE 115 in the idle mode or the inactive mode, such as the UE 115-*b*, may transmit, using resources from the indicated resource pool, a service request message indicating an interest of the UE 115-*b* in receiving the service. The base station 105-*a* may count, determine, or estimate the number of UEs 115 in inactive or idle mode that are monitoring for each multicast service based on the number of received service request messages for respective multicast services. In some cases, the base station 105-*a* may receive a number of feedback messages 220 and may determine that a number of UEs 115 are in inactive or idle mode. The base station 105-*a* may compare the number of feedback messages to the number of UEs 115 to determine whether to retransmit one or more multicast messages.

In some examples, the base station 105-*a* may not configure an identifier for a UE 115-*b* in inactive or idle mode for communications with the base station 105-*a*, such as a radio network temporary identifier (RNTI) or cell RNTI (C-RNTI). In order for the base station 105-*a* to identify which UE 115 has transmitted a service request message, the UE 115-*b* may use an identifier of the UE 115-*b* to transmit the service request message. For example, the UE 115-*b* may hash the service request message with a device identifier of the UE 115-*b* (for example, based on a hash function or hash code corresponding to the device identifier) and transmit the hashed service request message to the base station 105-*a*.

In some examples, to reduce system overhead, the base station 105-*a* may not count every inactive UE 115 or idle UE 115. Instead, the base station 105-*a* may configure each inactive UE 115 or idle UE 115 with a probability indicator. In some examples, a percentage associated with a probability of transmitting multicast feedback (such as 1%, 2%, 5%, or 10%, among other examples) may represent, or be representative of, each probability indicator. Each of the UEs 115 may transmit the service request message in one or more counting durations. In some cases, the UEs 115 may transmit the service request message according to the probability indicator. For example, each of the UEs 115 may consider the probability indicator when determining whether to transmit the service request message. As an example, for every 100 counting durations, a UE 115 (such as UE 115-*b*) with a probability indicator of 10% may transmit 10% of the time (for example, the UE 115-*b* may transmit a service request message in 10 of the 100 counting durations). This may enable the base station 105-*a* to count the UEs 115 that transmit a service request message and to use the probability indicator to estimate the total quantity of UEs 115 the base station 105-*a* may support. In some cases, the total quantity of UEs 115 may include UEs in a connected mode and UEs in an inactive mode.

Figure 3:
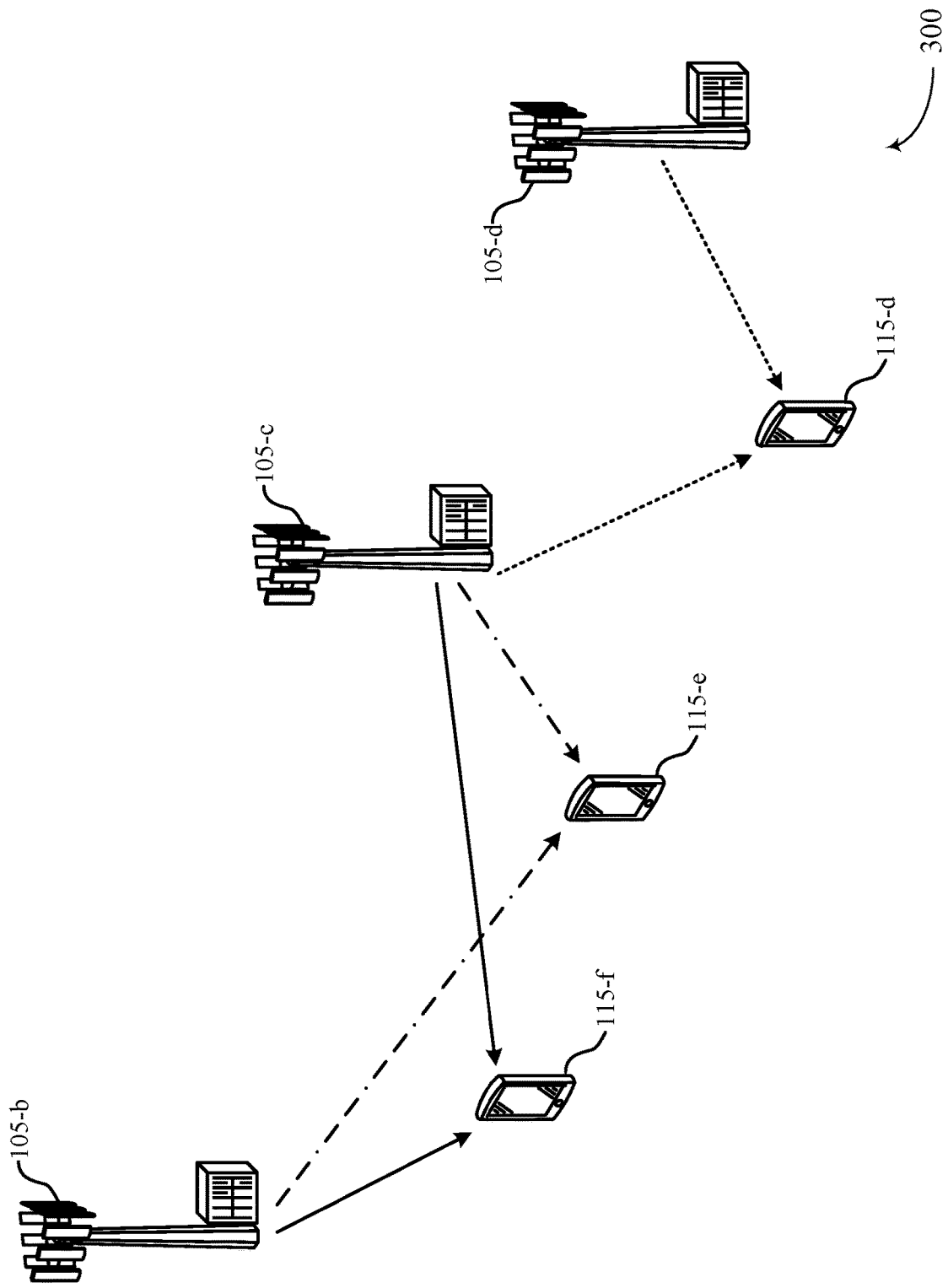

FIG. 3 illustrates an example of a wireless communications system 300 that supports feedback for multicast transmissions in accordance with aspects of the present disclosure. In some examples, the wireless communications system 300 may implement aspects of the wireless communications systems 100 or 200. The wireless communications system 300 may include UEs 115 and base stations 105, which may be respective examples of UEs 115 and base stations 105 as described with reference to FIG. 1.

The wireless communications system 300 may support multiple TA commands for UEs 115 to use while in an inactive or idle mode for transmitting feedback for multicast messages. In some implementations, a base station 105-*b* may determine that UEs in an inactive or idle mode may use a set of TA commands, transmit the TA command to one or more UEs 115, and receive feedback from one or more UEs 115 according to a TA command of the set of TA commands.

In some implementations, a base station 105-*b* may determine one or more TA commands based on a number of factors. The factors may include historical data or information such as previously configured TA commands, information associated with neighboring or serving cells (for example, a relative delay between the serving cell and one or more neighboring cells), information from other wireless devices such as other UEs in the wireless communications system 300, RSRP, a geographical location or topography in which the wireless communications system 300 operates, or the position of the UE 115, among other examples.

For example, the base station 105-*b* may determine a first TA command for a UE 115, such as a UE 115-*f*, based on a position of the UE 115-*f* with respect to the base station 105-*b*, or a base station 105-*c*, or both. The base station 105-*c* may determine a TA command for a UE 115, such as a UE 115-*e*, based on the position of the UE 115-*e* with respect to the base station 105-*b*, or a base station 105-*c*, or both, and the base station 105-*c* may determine a TA command for a UE 115, such as a UE 115-*d*, based on the position of the UE 115-*d* with respect to the base station 105-*c*, or a base station 105-*d*, or both.

In some implementations, the base station 105-*b* (or another base station 105 in the wireless communications system 300) may determine a set of TA commands based on a set of channel metrics or system conditions (such as geographical location, environment, topography, quantity of users, quantity of and location of interfering objects such as buildings, among others). For example, the base station 105-*b* may provide a TA command having a TA value that corresponds to one or more channel metrics or positioning between the UE 115-*f* and one or more cells, such as a serving cell (which may be supported by base station 105-*b*), a neighboring cell (which may be supported by base station 105-*c*), or both. For instance, the base station 105-*b* may configure TA command 0 for use by UE 115-*f* in an inactive or idle mode if the serving cell RSRP (which the base station 105-*b* may support) is within a range of [X00, Y00] dB, neighboring cell 1 RSRP (which the base station 105-*c* may support) is within a range of [X01, Y01] dB, and neighboring cell 2 RSRP (which the base station 105-*d* may support) is within a range of [X02, Y02] dB, and so on. The base station 105-*b* may also configure TA command 1 for another set of channel metrics if serving cell RSRP is within a range of [X10, Y10] dB, neighboring cell 1 RSRP is within a range of [X11, Y11] dB, and neighboring cell 2 RSRP is within a range of [X12, Y12] dB.

In some examples, a base station 105-*b* (or another base station 105 in the wireless communications system 300) may configure one or more TA commands based on a relative delay between a serving cell and a neighboring cell. For instance, base station 105-*b* may configure a first TA command if the relative delay between the serving cell (which the base station 105-*b* may support) and a neighboring cell (such as a neighboring cell which the base station 105-*c* may support) is within a time range of [0, T0], and a second TA command if the relative delay between the serving cell (which the base station 105-*b* may support) and a neighboring cell (such as a neighboring cell which the base station 105-*c* may support) is within a time range of [T0, T1], and so on.

In some implementations, a base station 105-*b* (or another base station 105 in the wireless communications system 300) may configure one or more TA commands based on positioning ranges. For instance, base station 105-*b* may configure a first TA command for UE 115-*f* if the UE 115-*f* is within a positioning range 0, a second TA command for UE 115-*f* is the UE 115-*f* is within a positioning range 1, and so on.

The base station 105-*b* may determine a set of TA commands based on channel metrics, positions, or other conditions, and may broadcast, to the UEs 115, the set of TA commands. In some examples, the base station 105-*b* may transmit the set of TA commands and values via a feedback configuration message 215, as described with reference to FIG. 2. A UE 115 (for example, UE 115-*f*) in the inactive mode or the idle mode may receive the set of TA commands, and may determine a channel metric, position, or other condition of the UE 115-*f*. The UE 115-*f* may determine a TA command based on the determined channel metric, position or other condition, and may use the TA command to transmit a feedback message for multicast communications while in an inactive or idle mode. For instance, the UE 115-f may measure a set of channel metrics and based on the measured channel metrics, apply a TA value that corresponds to the TA command associated with the measured channel metrics to transmit a feedback message. In some cases, the UE 115-f may transmit the feedback message via PUCCH.

As the channel metrics, position, or other conditions of devices within the wireless communications system 300 change, the UEs 115 transmitting feedback for multicast communications while in an inactive or idle mode may use different TA commands. For example, the UE 115-f may move within a coverage area of a base station 105-b, or environmental conditions, number of active users, or other factors may channel quality. Accordingly, the UE 115-f may periodically reassess current conditions (for example, UE 115-f may remeasure the set of channel metrics) and may determine a TA command based on the current conditions. As an example, the UE 115-f may change position relative to the base station 105-b and the base station 105-c, and may apply a TA command corresponding to the new position of the UE 115-f for subsequent feedback messages for multicast communications while the UE 115-f is in the inactive or idle mode.

Figure 4:
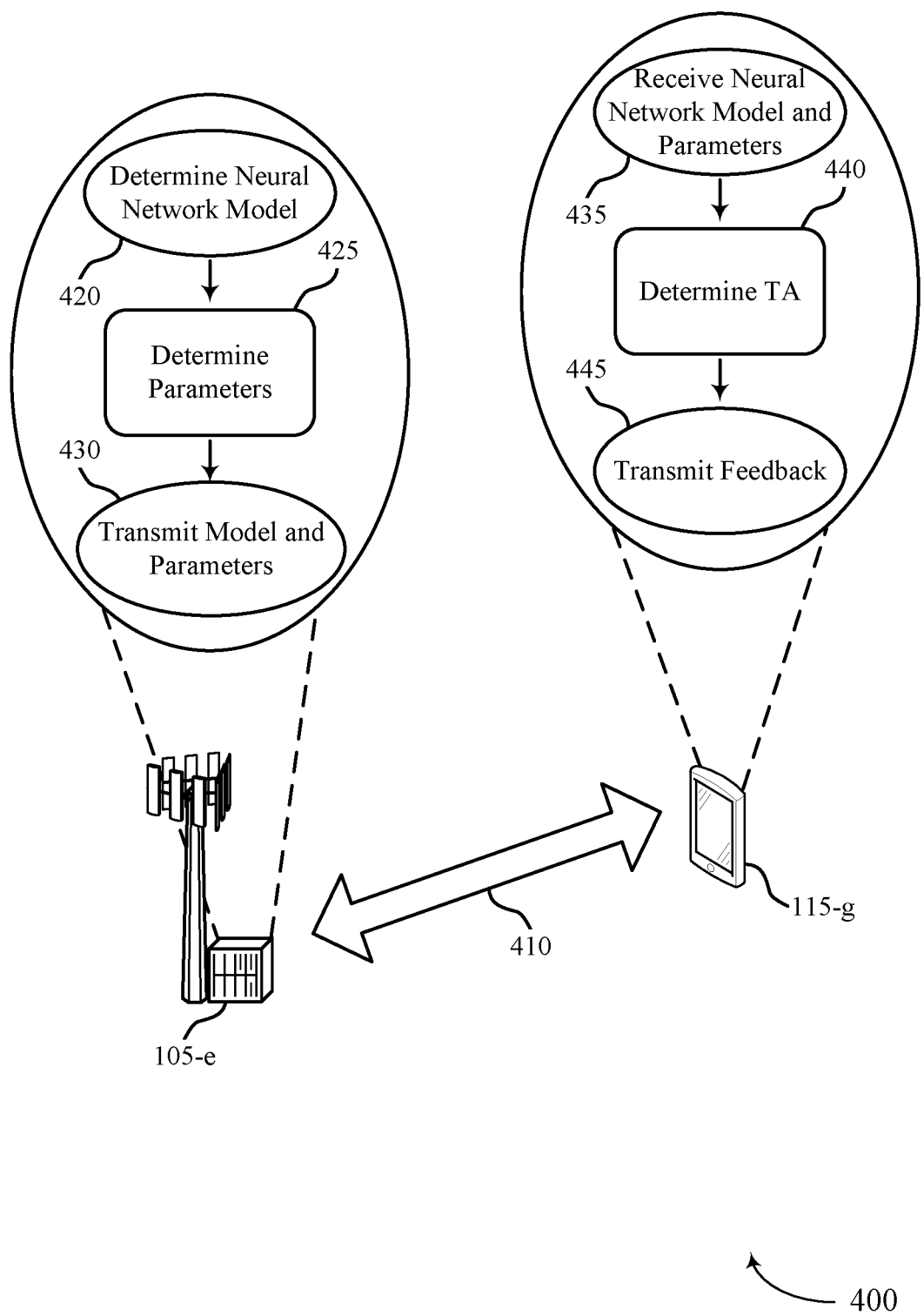

FIG. 4 illustrates an example of a wireless communications system 400 that supports feedback for multicast transmissions in accordance with aspects of the present disclosure. In some examples, the wireless communications system 400 may implement aspects of the wireless communications systems 100, 200, or 300. The wireless communications system 400 may include a UE 115-g and base station 105-e, which may be respective examples of a UE 115 and a base station 105 as described with reference to FIG. 1.

A UE may determining a TA command or TA values based on different channel metrics or positioning information of UEs 115 within a system, which may be computationally complex, may be associated with a high signaling overhead, or may consume storage or other resources at a UE. To reduce the signaling overhead, storage limitations, and other issues, wireless communications system 400 may support neural network modeling for determining TA commands. For example, a base station 105-e may utilize a neural network model and determine an associated set of neural network parameters to determine one or more TA commands. The UE 115-g may use the one or more TA commands for transmitting feedback for multicast communications while in an inactive or idle mode.

In some implementations, the base station 105-e may determine a neural network modeling algorithm that represents a statistical model for TA commands based on a neural network modeling algorithm and other data available at the base station 105-e. For instance, the base station 105-e may utilize historical data (previously configured TA values, positioning data of the UE 115-g or other UEs, among others) or information from neighboring devices or cells to calculate TA values for a set of TA commands, such as the TA commands as described with reference to FIG. 3. In some implementations, the base station 105-a may indicate, or the UE 115-g may determine, parameters such as channel metrics or positioning information, and the base station 105-e may base the neural network model on the parameters. For example, the base station 105-e may indicate a neural network model, a set of neural network parameters, or both to the UE 115-g via communication link 410. The UE 115-g may determine input parameters, such as measured channel metrics at the UE 115-g, positioning information at the UE 115-g, among others, and determine a TA command to use for transmitting feedback for multicast communications using the neural network model and neural network parameters that the base station 105-e may indicate. After receiving a multicast message via communication link 410, the UE 115-g may transmit a feedback message (such as a feedback message 220 as described with reference to FIG. 2) using the determined TA command.

As an example, at 420, the base station 105-e may determine the neural network model that the base station 105-e may base on static (elevation, geography, or base station position, among other examples) and dynamic (weather, RSRP, or UE position, among other examples) conditions. The conditions may be parameters for the model and may correspond to a set of TA commands, such as the TA commands as described with reference to FIG. 3. At 425, the base station 105-e may determine the parameters for a neural network model that may represent the TA commands. At 430, the base station 105-e may transmit an indication of the neural network model and the neural network parameters via the communication link 410 to the UE 115-g. In some examples, the base station 105-e may transmit the neural network model and the neural network parameters along with a TA command for the UE 115-g in an active or connected mode, or the base station 105-e may include the neural network model and the neural network parameters in a configuration message (such as feedback configuration message 215 as described with reference to FIG. 2).

At 435, the UE 115-g may receive the neural network model and the neural network parameters and based on the neural network model and the neural network parameters may determine a TA command to use to transmit feedback for multicast communications while in an inactive or idle mode at 440. In some examples, at 440, the UE 115-g may determine UE specific parameters to input to the model (for example, the UE 115-g may measure channel metrics, current position), and at 445, the UE 115-g may transmit feedback to the base station 105-e according to the determined TA value.

At various times and for a variety of reasons, the UE 115-g may transition from an inactive or idle mode to an active or connected mode, while which the UE 115-g may receive an updated neural network model and neural network parameters from the base station 105-e. The UE 115-g may base the updated model and parameters on the additional data accumulated, analyzed, or otherwise processed while the UE 115-g was in the inactive or idle mode.

Figure 5:
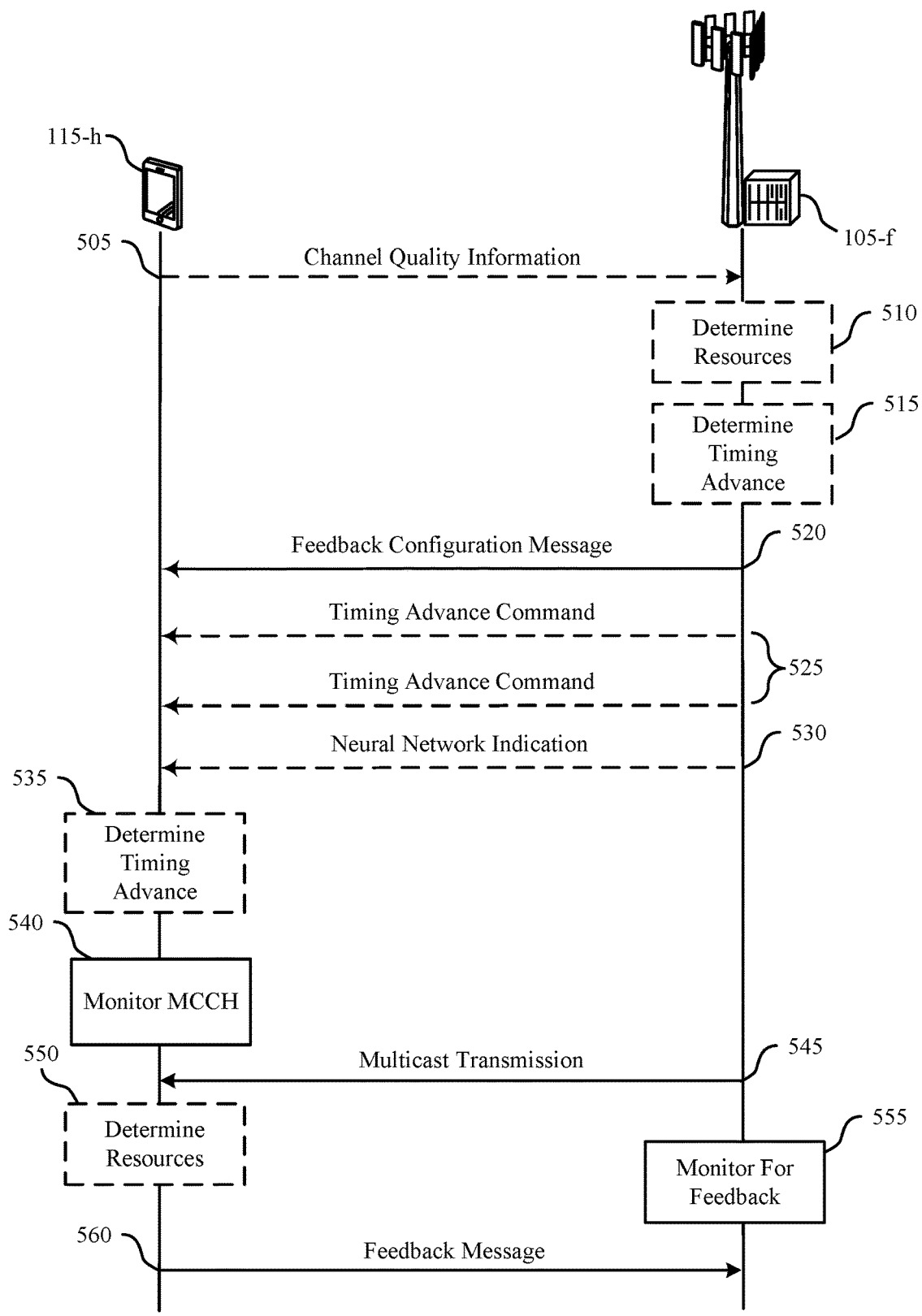
FIGS. 5 and 6 show process flows that support feedback for multicast transmissions in accordance with aspects of the present disclosure.

FIG. 5 illustrates an example of a process flow 500 that supports feedback for multicast transmissions in accordance with aspects of the present disclosure. In some examples, process flow 500 may implement aspects of wireless communications systems 100, 200, 300, or 400. The process flow 500 may include a UE 115-h and a base station 105-f, which may be respective examples of a UE 115 and a base station 105. Alternative examples of the following may be implemented, in which some processes are performed in a different order than described or are not performed at all. In some implementations, processes may include additional features not mentioned below, or further processes may be added.

At 505, the UE 115-h may optionally transmit, to the base station 105-f, an indication of channel quality information, which may include one or more channel metrics measured by the UE 115-h. For example, the UE 115-h may indicate a signal strength, an angle, a beam identification, or a location of the UE 115-h.

At 510, the base station 105-f may optionally determine resources for the UE 115-h to use for transmitting feedback for multicast communications while the UE 115-*h* is in an inactive or idle mode. In some implementations, the base station 105-*f* may determine the resources based on the channel metrics. The resources may be PRACH resources or preambles, PUCCH resources, among others. In some examples, the base station 105-*f* may determine a set of resources (for example, a pool of resources) to designate for feedback transmissions from the UE 115-*h*.

In some examples, at 515, the base station 105-*f* may determine one or more TA commands for the UE 115-*h*. The base station 105-*f* may base the TA commands on channel metrics (for example, the channel quality information transmitted at 505). For example, each TA command may correspond to a set of channel metrics and a corresponding TA value.

At 520, the base station 105-*f* may transmit, to the UE 115-*h*, a feedback configuration message. The feedback configuration message may be an example of a feedback configuration message 215 as described with reference to FIG. 2. In some examples, the feedback configuration message may include the one or more TA commands determined at 515. Additionally, or alternatively, the feedback configuration message may include an indication of the resources determined at 510.

At 525, the base station 105-*f* may optionally transmit the determined TA commands to the UE 115-*h*. For example, the base station 105-*f* may optionally transmit one or more TA commands at 525 if the TA commands are not included in the feedback configuration message at 520.

At 530, the base station 105-*f* may optionally transmit an indication of or associated with a neural network model and neural network parameters for determining TA commands or TA values. For instance, in some implementations, the base station 105-*f* may utilize a neural network to determine the one or more TA commands (for example, at 515), and in such cases, the base station 105-*f* may determine a neural network model and associated parameters that the base station 105-*f* may use to calculate a TA command or TA value for the UE 115-*h* to use for transmitting feedback for multicast communications while in an inactive or idle mode. The base station 105-*f* may determine the neural network model based on historical data, or other parameters.

At 535, the UE 115-*h* may determine a TA command or TA value to use for transmitting feedback for multicast communications. In some implementations, the UE 115-*h* may use the neural network model, neural network parameters, and, in some cases, UE-specific parameters, to determine the TA command to use for multicast feedback while in an inactive or idle mode. In other examples, the base station 105-*f* may transmit one or more TA commands at 525, and the UE 115-*h* may use the one or more TA commands to determine a TA value to use for multicast feedback.

At 540, the UE 115-*h* may monitor for multicast communications from the base station 105-*f*. The base station 105-*f* may, in some cases, transmit a multicast control channel via a set of resources allocated for multicast communications. The multicast control channel may indicate scheduling information for multicast communications. If the UE 115-*h* successfully receives the multicast control channel, the UE 115-*h* may determine resources scheduled for the multicast communications and may monitor the determined resources for the multicast communications from the base station 105-*f* at 545.

Optionally, at 550, the UE 115-*h* may determine resources to use to transmit a feedback message to the base station 105-*f* in response to the multicast communication. For example, the UE 115-*h* may determine the resources based on channel metrics, or the base station 105-*f* may transmit the feedback configuration message at 520 that may indicate the resources. The resources may include PRACH resources or preambles, PUCCH resources, among others.

At 555, the base station 105-*f* may monitor the multicast control channel for a feedback message from the UE 115-*h*. At 560, the UE 115-*h* may transmit the feedback message to the base station 105-*f* over the multicast control channel and using the determined resources.

Figure 6:
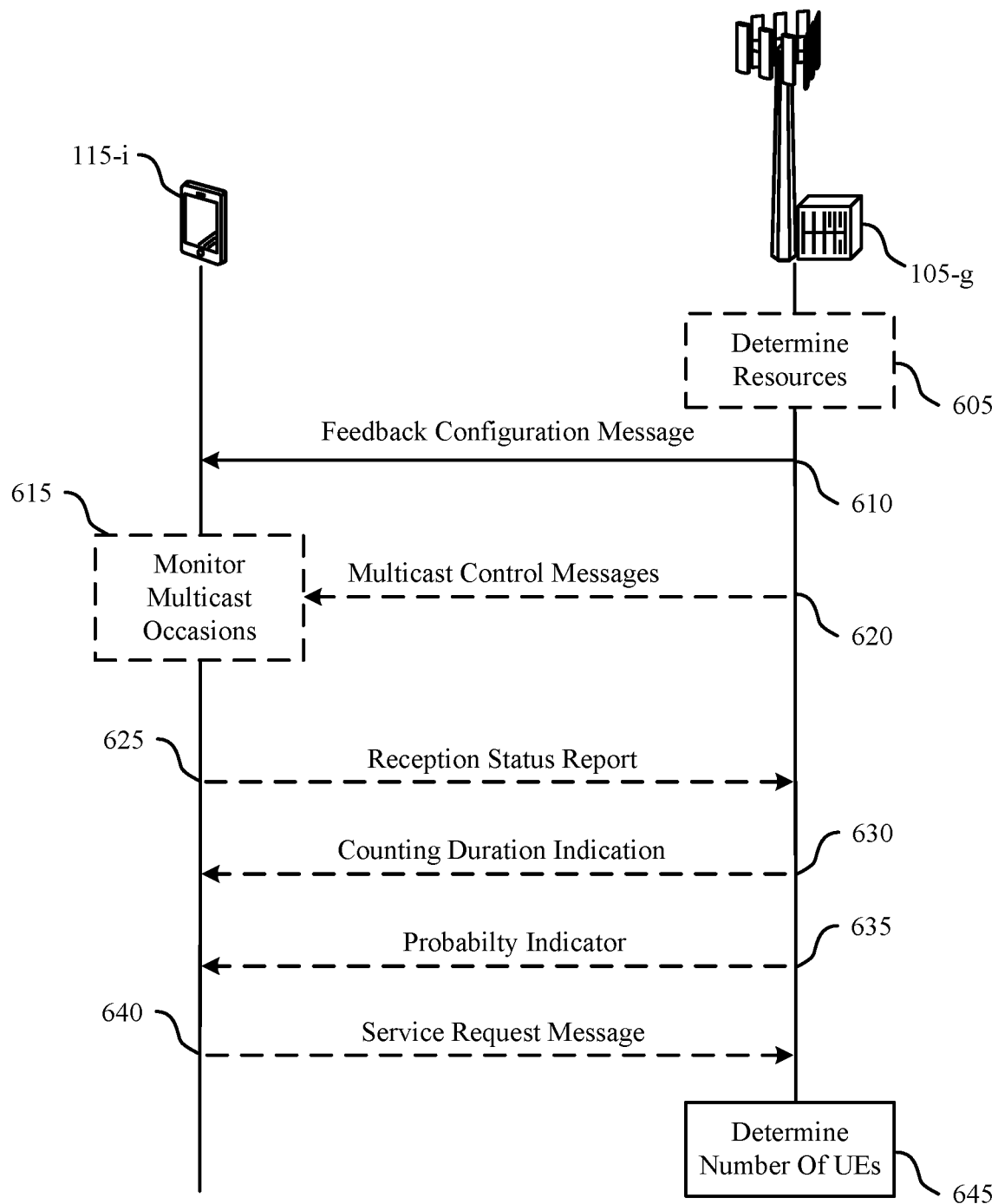

FIG. 6 illustrates an example of a process flow 600 that supports feedback for multicast transmissions in accordance with aspects of the present disclosure. In some examples, process flow 600 may implement aspects of wireless communications systems 100, 200, 300, or 400. The process flow 600 may include a UE 115-*i* and a base station 105-*g*, which may be respective examples of a UE 115 and a base station 105. Alternative examples of the following may be implemented, in which some processes are performed in a different order than described or are not performed at all. In some implementations, processes may include additional features not mentioned below, or further processes may be added.

At 605, the base station 105-*g* may optionally determine resources for the UE 115-*f* to use for a feedback message. In some implementations, the base station 105-*g* mzy determine the resources based on the channel metrics. The resources may be PRACH resources or preambles, PUCCH resources, among others. In some examples, the base station 105-*g* may determine a set of resources (for example, a pool of resources) to designate for feedback transmissions from the UE 115-*i*.

At 610, the base station 105-*g* may transmit, to the UE 115-*i*, a feedback configuration message. The feedback configuration message may be an example of a feedback configuration message 215 as described with reference to FIG. 2. In some examples, the feedback configuration message may include an indication of the resources determined at 605. The feedback configuration message may include an indication for the UE 115-*i* to transmit a reception status report. In other examples, the base station 105-*g* may transmit the indication for the UE 115-*i* to transmit a reception status report in a message separate from the feedback configuration message.

In some implementations, at 615, the UE 115-*i* may monitor for one or more multicast communications via one or more multicast occasions.

At 620, the base station 105-*g* may transmit one or more physical control channels for multicast communications during the one or more multicast occasions. The physical control channels for multicast communications may include scheduling information for a multicast message.

At 625, the UE 115-*i* may transmit a reception status report to the base station 105-*g*. The reception status report may include a quantity of physical control channels for multicast communications decoded at the UE 115-*i*, a quantity of multicast occasions monitored by the UE 115-*i*, a ratio between the quantity of physical control channels received and the quantity of physical control channels transmitted by the base station 105-*g*, among other information.

At 630, the base station 105-*g* may transmit, to the UE 115-*i*, a counting duration indication specifying a counting duration for one or more services of multicast communications supported by the base station 105-*g*. The counting duration indication may, in some examples, include an indication of a resource or resource pool for the UE 115-*i* to transmit a service request message in response to the base station 105-*g* during the counting duration.

At 635, the base station 105-g may optionally transmit a probability indicator to the UE 115-i. The probability indicator may specify a probability in which the UE 115-i is to transmit a service request message in response during the counting duration.

At 640, in response to the counting duration indication transmitted at 630, the UE 115-i may transmit a service request message indicating interest in receiving a service. The UE 115-I may transmit the service request message on the indicated resource or resource pool and, in some examples, may transmit the service request message according to the probability indicator received at 635.

At 645, the base station 105-g may determine the quantity of UEs requesting the given multicast service. For example, the base station 105-g may monitor the counting duration for service request messages from one or more UEs including the UE 115-i, and determine the quantity of UEs (inactive or otherwise) requesting a given multicast service. In some implementations, the base station 105-g may determine the quantity of UEs based on the probability indicator transmitted at 635. For instance, if probability indicator is 1%, and the base station 105-g receives 1 service request message at 640 (from UE 115-i for example), the base station 105-g may determine that because only 1% of the UEs (according to the probability indicator) transmitted a service request message, approximately 100 UEs are requesting the multicast service.

Figure 7:
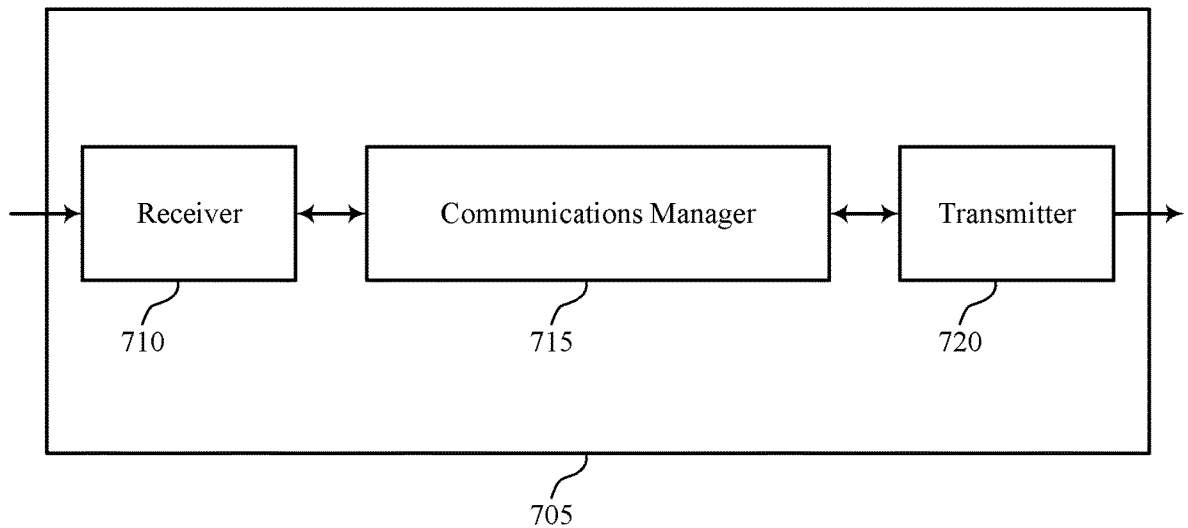
FIGS. 7 and 8 show block diagrams of devices that support feedback for multicast transmissions in accordance with aspects of the present disclosure.

FIG. 7 shows a block diagram of a device 705 that supports feedback for multicast transmissions in accordance with aspects of the present disclosure. The device 705 may be an example of aspects of a UE 115. The device 705 may include a receiver 710, a communications manager 715, and a transmitter 720. The communications manager 715 may be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to feedback for multicast transmissions). Information may be passed on to other components of the device 705. The receiver 710 may be an example of aspects of the transceiver described with reference to FIG. 8. The receiver 710 may utilize a single antenna or a set of antennas.

The communications manager 715 may receive, from a base station, one or more configurations for use by the UE, while in an inactive mode or an idle mode, to provide feedback associated with multicast transmissions from the base station, monitor, by the UE while in the inactive mode or the idle mode, a set of time-frequency resources configured for multicast transmissions from the base station, and transmit, by the UE while in the inactive mode or the idle mode, one or more multicast feedback messages in accordance with the one or more configurations based on the monitoring. The communications manager 715 may be an example of aspects of the communications manager 815 described herein.

The transmitter 720 may transmit signals generated by other components of the device 705. In some examples, the transmitter 720 may be collocated with a receiver 710 in a transceiver component. For example, the transmitter 720 may be an example of aspects of the transceiver described with reference to FIG. 8. The transmitter 720 may utilize a single antenna or a set of antennas.

In some examples, the communications manager 715 may be implemented as an integrated circuit or chipset for a mobile device modem, and the receiver 710 and transmitter 720 may be implemented as analog components (for example, amplifiers, filters, antennas) coupled with the mobile device modem to enable wireless transmission and reception over one or more bands.

The communications manager 715 may be implemented to realize one or more potential advantages. One implementation may allow the device 705 to provide feedback for multicast communications while in an inactive or idle mode or in other scenarios in which the device 705 does not have a valid or configured TA to use for transmitting feedback. Based on the techniques for multicast feedback between the device 705 and a base station, the device 705 may be capable of providing feedback that it otherwise may not have been able to provide without having to transition a connected mode to obtain a valid TA, which may utilize limited resources such as power and battery life at the device 705. The ability to transmit feedback for multicast communications in an idle or inactive mode may also increase the likelihood of receiving retransmissions successfully.

Figure 8:
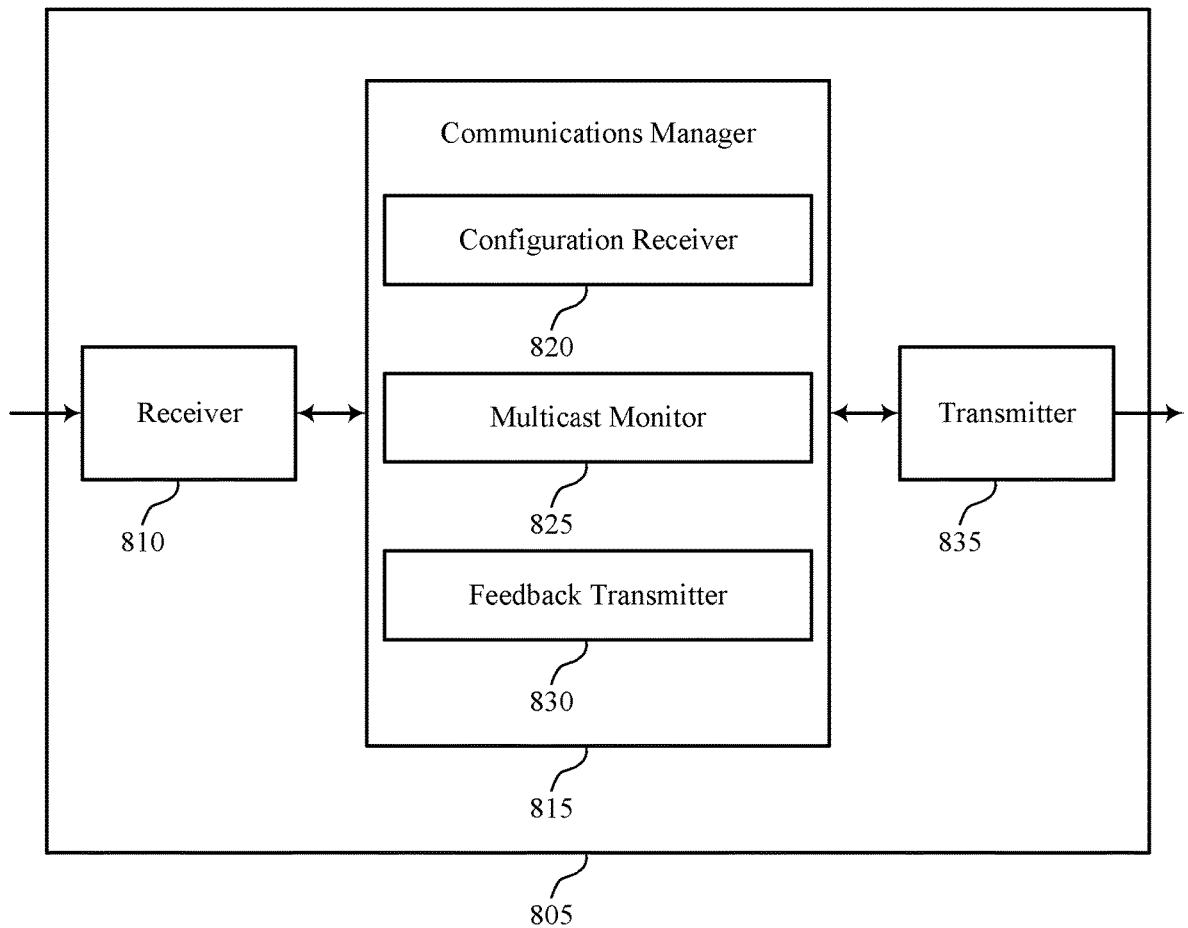

FIG. 8 shows a block diagram of a device 805 that supports feedback for multicast transmissions in accordance with aspects of the present disclosure. The device 805 may be an example of aspects of a device 705, or a UE 115. The device 805 may include a receiver 810, a communications manager 815, and a transmitter 835. The communications manager 815 may be implemented, at least in part, by one or both of a modem and a processor. Each of these components may be in communication with one another (for example, via one or more buses).

The receiver 810 may receive information such as packets, user data, or control information associated with various information channels (for example, control channels, data channels, and information related to feedback for multicast transmissions). Information may be passed on to other components of the device 805. The receiver 810 may be an example of aspects of the transceiver described with reference to FIG. 8. The receiver 810 may utilize a single antenna or a set of antennas.

The communications manager 815 may be an example of aspects of the communications manager 715. The communications manager 815 may include a configuration receiver 820, a multicast monitor 825, and a feedback transmitter 830.

The configuration receiver 820 may receive, from a base station, one or more configurations for use by the UE, while in an inactive mode or an idle mode, to provide feedback associated with multicast transmissions from the base station.

The multicast monitor 825 may monitor, by the UE while in the inactive mode or the idle mode, a set of time-frequency resources configured for multicast transmissions from the base station.

The feedback transmitter 830 may transmit, by the UE while in the inactive mode or the idle mode, one or more multicast feedback messages in accordance with the one or more configurations based on the monitoring.

The transmitter 835 may transmit signals generated by other components of the device 805. In some examples, the transmitter 835 may be collocated with a receiver 810 in a transceiver component. For example, the transmitter 835 may be an example of aspects of the transceiver described with reference to FIG. 8. The transmitter 835 may utilize a single antenna or a set of antennas.

Figure 9:
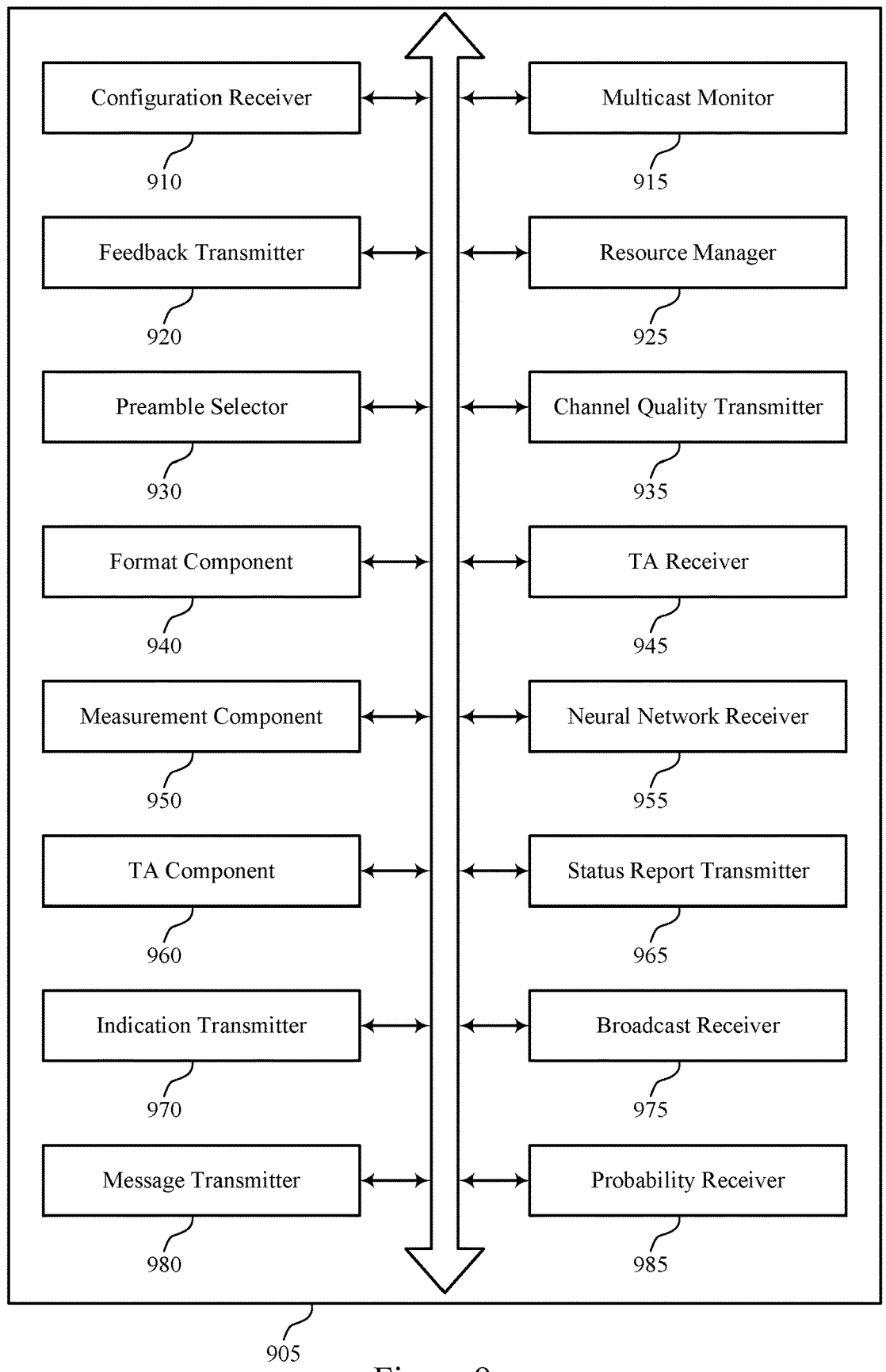
FIG. 9 shows a diagram of a communications manager that supports feedback for multicast transmissions in accordance with aspects of the present disclosure.

FIG. 9 shows a block diagram of a communications manager 905 that supports feedback for multicast transmissions in accordance with aspects of the present disclosure. The communications manager 905 may include a configuration receiver 910, a multicast monitor 915, a feedback transmitter 920, a resource manager 925, a preamble selector 930, a channel quality transmitter 935, a format component 940, a TA receiver 945, a measurement component 950, a neural network receiver 955, a TA component 960, a status report transmitter 965, an indication transmitter 970, a broadcast receiver 975, a message transmitter 980, and a probability receiver 985. Each of these components may communicate, directly or indirectly, with one another (for example, via one or more buses).

The configuration receiver 910 may receive, from a base station, one or more configurations for use by the UE, while in an inactive mode or an idle mode, to provide feedback associated with multicast transmissions from the base station. In some examples, the configuration receiver 910 may receive system information or a multicast control channel that indicates the one or more configurations.

The multicast monitor 915 may monitor, by the UE while in the inactive mode or the idle mode, a set of time-frequency resources configured for multicast transmissions from the base station. In some examples, the multicast monitor 915 may receive a multicast message over the set of time-frequency resources based on the monitoring, in which selecting the preamble of the set of RACH preambles includes selecting the preamble based on a channel quality metric associated with the received multicast message.

In some examples, the multicast monitor 915 may receive a multicast message over the set of time-frequency resources based on the monitoring. In some examples, the multicast monitor 915 may monitor multiple time occasions for multicast transmissions from the base station. In some examples, the multicast monitor 915 may receive a set of physical control channels for multicast transmissions based on the monitoring of the multiple time occasions.

The feedback transmitter 920 may transmit, by the UE while in the inactive mode or the idle mode, one or more multicast feedback messages in accordance with the one or more configurations based on the monitoring. In some examples, the feedback transmitter 920 may pad a payload of the one or more multicast feedback messages based on a size associated with the uplink control format. In some examples, the feedback transmitter 920 may transmit the one or more multicast feedback messages based on an absence of reception of a multicast transmission over the set of time-frequency resources during the monitoring, in which the one or more multicast feedback messages include a negative acknowledgement feedback message.

In some examples, the feedback transmitter 920 may transmit the one or more multicast feedback messages based on reception of a multicast transmission over the set of time-frequency resources during the monitoring, in which the one or more multicast feedback messages include an acknowledgement feedback message. In some examples, the feedback transmitter 920 may refrain from transmitting the one or more multicast feedback messages in accordance with a timing advance value of the UE.

The resource manager 925 may determine a set of RACH resources available for multicast feedback based on a resource allocation indicated by the one or more configurations, in which transmitting the one or more multicast feedback messages includes transmitting the one or more multicast feedback messages via the set of RACH resources. In some examples, the resource manager 925 may determine a set of RACH preambles available for multicast feedback based on a resource allocation indicated by the one or more configurations.

In some examples, the resource manager 925 may determine time-frequency resources for multicast feedback based on the channel quality information, in which transmitting the one or more multicast feedback messages includes transmitting the one or more multicast feedback messages via the determined time-frequency resources. In some examples, the resource manager 925 may determine a resource pool available for multicast feedback based on the one or more configurations, in which transmitting the one or more multicast feedback messages includes transmitting the one or more multicast feedback messages using a subset of time-frequency resources of the resource pool.

In some examples, the resource manager 925 may determine a set of PUCCH resources available for multicast feedback based on the one or more configurations, in which transmitting the one or more multicast feedback messages includes transmitting the one or more multicast feedback messages using a subset of the PUCCH resources. In some examples, the resource manager 925 may determine a set of uplink resources available for a reception status report associated with multicast transmissions from the base station. In some implementations, the set of uplink resources includes RACH resources or uplink control channel resources.

The preamble selector 930 may select a preamble of the set of RACH preambles, in which transmitting the one or more multicast feedback messages includes transmitting the one or more multicast feedback messages using the selected preamble.

The channel quality transmitter 935 may transmit channel quality information associated with the received multicast message. In some implementations, the channel quality information includes one or more of reference signal received power, beam direction, beam width, geographical location, or altitude and azimuth values associated with one or more beams.

The format component 940 may determine an uplink control format for the one or more multicast feedback messages.

The TA receiver 945 may receive a timing advance command from the base station, the timing advance command indicating a timing advance for use by the UE while in the inactive mode or the idle mode, in which the timing advance command corresponds to first set of values for one or more channel metrics associated with the UE and associated with one or more cells including a serving cell for the UE. In some examples, the TA receiver 945 may receive a second timing advance command from the base station, the second timing advance command indicating a second timing advance for use by the UE while in the inactive mode or the idle mode, in which the second timing advance command corresponds to second set of values for one or more channel metrics associated with the UE and associated with one or more cells including the serving cell for the UE. In some examples, the TA receiver 945 may receive one or more of the timing advance command or the second timing advance command in the one or more configurations, the one or more configurations indicating a set of uplink resources for multicast feedback, in which transmitting the one or more multicast feedback messages includes transmitting the one or more multicast feedback messages using the set of uplink resources. In some implementations, the one or more channel metrics include one or more of a reference signal received power, a relative delay between the serving cell and one or more other cells, or a positioning range of the UE.

The measurement component 950 may measure a set of channel metrics of the one or more cells including the serving cell, in which transmitting the one or more multicast feedback messages includes transmitting the one or more multicast feedback messages using the timing advance based on the set of channel metrics satisfying the first set of values or using the second timing advance based on the set of channel metrics satisfying the second set of values.

The neural network receiver 955 may receive a set of neural network parameters in the timing advance command from the base station, in which the set of neural network parameters indicate the timing advance. In some examples, the neural network receiver 955 may receive, at the UE while in a connected mode, a neural network model and a set of neural network parameters from the base station, the neural network model and the set of neural network parameters being associated with a neural network for a timing advance. In some examples, the neural network receiver 955 may receive one or more neural network parameters from the base station.

The TA component 960 may determine the timing advance based on the neural network model, the set of neural network parameters, and the one or more neural network parameters, in which transmitting the one or more multicast feedback messages includes transmitting, by the UE while in the inactive mode or the idle mode, the one or more multicast feedback messages based on the timing advance.

The status report transmitter 965 may transmit the reception status report using the set of uplink resources.

The indication transmitter 970 may transmit an indication of a quantity of the received set of physical control channels for multicast transmissions in the reception status report. In some examples, the indication transmitter 970 may transmit, in the reception status report, a ratio between the quantity of the received set of physical control channels for multicast transmissions and a total quantity of physical control channels for multicast transmissions transmitted over the multiple time occasions. In some implementations, the total quantity of physical control channels for multicast transmissions corresponds to a set of uplink control channel resources.

The broadcast receiver 975 may receive a broadcast message from the base station indicating a counting duration for a service of the multicast transmissions supported by the base station.

The message transmitter 980 may transmit a message over the counting duration requesting the service of the multicast transmissions supported by the base station. In some examples, the message transmitter 980 may transmit the message based on an identifier of the UE. In some examples, the message transmitter 980 may transmit the message in accordance with the probability indicator. In some implementations, the message includes an uplink control channel message or a RACH message.

The probability receiver 985 may receive, from the base station, a probability indicator for the UE.

Figure 10:
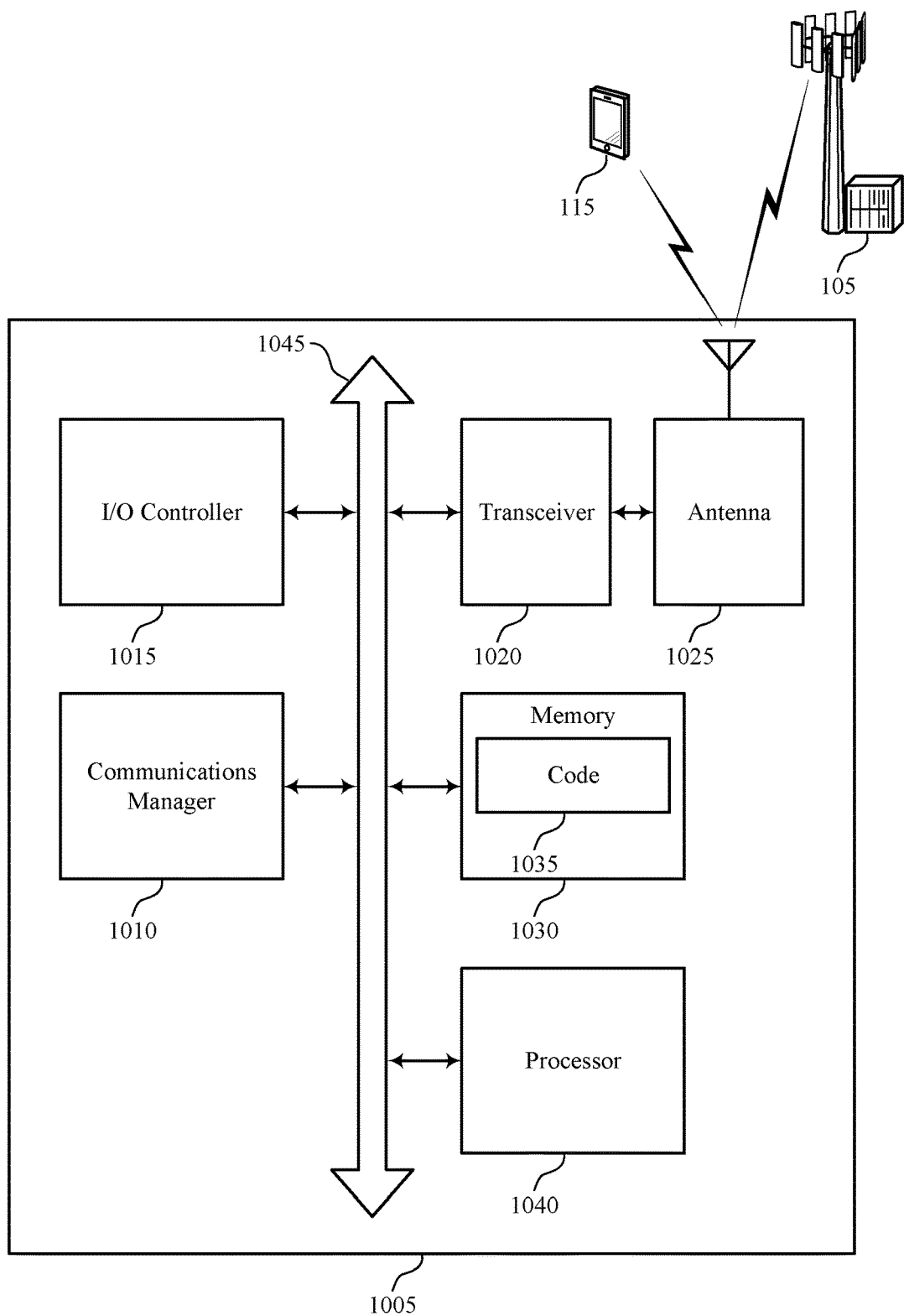
FIG. 10 shows a system including a device that supports feedback for multicast transmissions in accordance with aspects of the present disclosure.

FIG. 10 shows a diagram of a system including a device 1005 that supports feedback for multicast transmissions in accordance with aspects of the present disclosure. The device 1005 may be an example of or include the components of device 705, device 805, or a UE 115. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (for example, bus 1045).

The communications manager 1010 may receive, from a base station, one or more configurations for use by the UE, while in an inactive mode or an idle mode, to provide feedback associated with multicast transmissions from the base station, monitor, by the UE while in the inactive mode or the idle mode, a set of time-frequency resources configured for multicast transmissions from the base station, and transmit, by the UE while in the inactive mode or the idle mode, one or more multicast feedback messages in accordance with the one or more configurations based on the monitoring.

The I/O controller 1015 may manage input and output signals for the device 1005. The I/O controller 1015 may also manage peripherals not integrated into the device 1005. In some implementations, the I/O controller 1015 may represent a physical connection or port to an external peripheral. In some implementations, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some implementations, the I/O controller 1015 may be implemented as part of a processor. In some implementations, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some implementations, the device 1005 may include a single antenna 1025, or the device 1005 may have more than one antenna 1025, which may be capable of concurrently transmitting or receiving multiple wireless transmissions.

The memory 1030 may include random access memory (RAM) and read only memory (ROM). The memory 1030 may store computer-readable, computer-executable code 1035 including instructions that, when executed, cause the processor to perform various functions described herein. In some implementations, the memory 1030 may contain, among other things, a basic I/O system (BIOS) which may control basic hardware or software operation such as the interaction with peripheral components or devices.

The processor 1040 may include an intelligent hardware device, (for example, a general-purpose processor, a DSP, a central processing unit (CPU), a microcontroller, an ASIC, an FPGA, a programmable logic device, a discrete gate or transistor logic component, a discrete hardware component, or any combination thereof). In some implementations, the processor 1040 may be configured to operate a memory array using a memory controller. In other cases, a memory controller may be integrated into the processor 1040. The processor 1040 may be configured to execute computer-readable instructions stored in a memory (for example, the memory 1030) to cause the device 1005 to perform various functions (for example, functions or tasks supporting feedback for multicast transmissions).

The code 1035 may include instructions to implement aspects of the present disclosure, including instructions to support wireless communications. The code 1035 may be stored in a non-transitory computer-readable medium such as system memory or other type of memory. In some implementations, the code 1035 may not be directly executable by the processor 1040 but may cause a computer (for example, when compiled and executed) to perform functions described herein.

Figure 11:
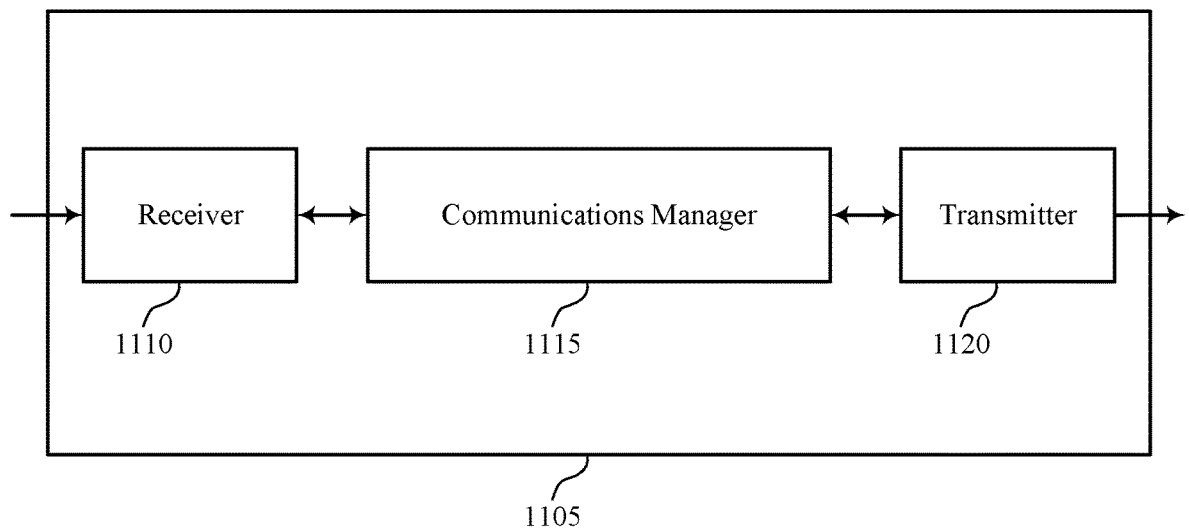
FIGS. 11 and 12 show block diagrams of devices that support feedback for multicast transmissions in accordance with aspects of the present disclosure.

FIG. 11 shows a block diagram of a device 1105 that supports feedback for multicast transmissions in accordance with aspects of the present disclosure. The device 1105 may be an example of aspects of a base station 105. The device 1105 may include a receiver 1110, a communications manager 1115, and a transmitter 1120. The communications manager 1115 may be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to feedback for multicast transmissions). Information may be passed on to other components of the device 1105. The receiver 1110 may be an example of aspects of the transceiver described with reference to FIG. 12. The receiver 1110 may utilize a single antenna or a set of antennas.

The communications manager 1115 may transmit, to a UE, one or more configurations for multicast feedback by the UE in an inactive mode or an idle mode, transmit one or more multicast transmissions via a set of time-frequency resources configured for multicast communications, and monitor, based on transmitting the one or more multicast transmissions, for one or more multicast feedback messages from the UE in accordance with the one or more configurations. The communications manager 1115 may be an example of aspects of the communications manager 1215 described herein.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver described with reference to FIG. 12. The transmitter 1120 may utilize a single antenna or a set of antennas.

Figure 12:
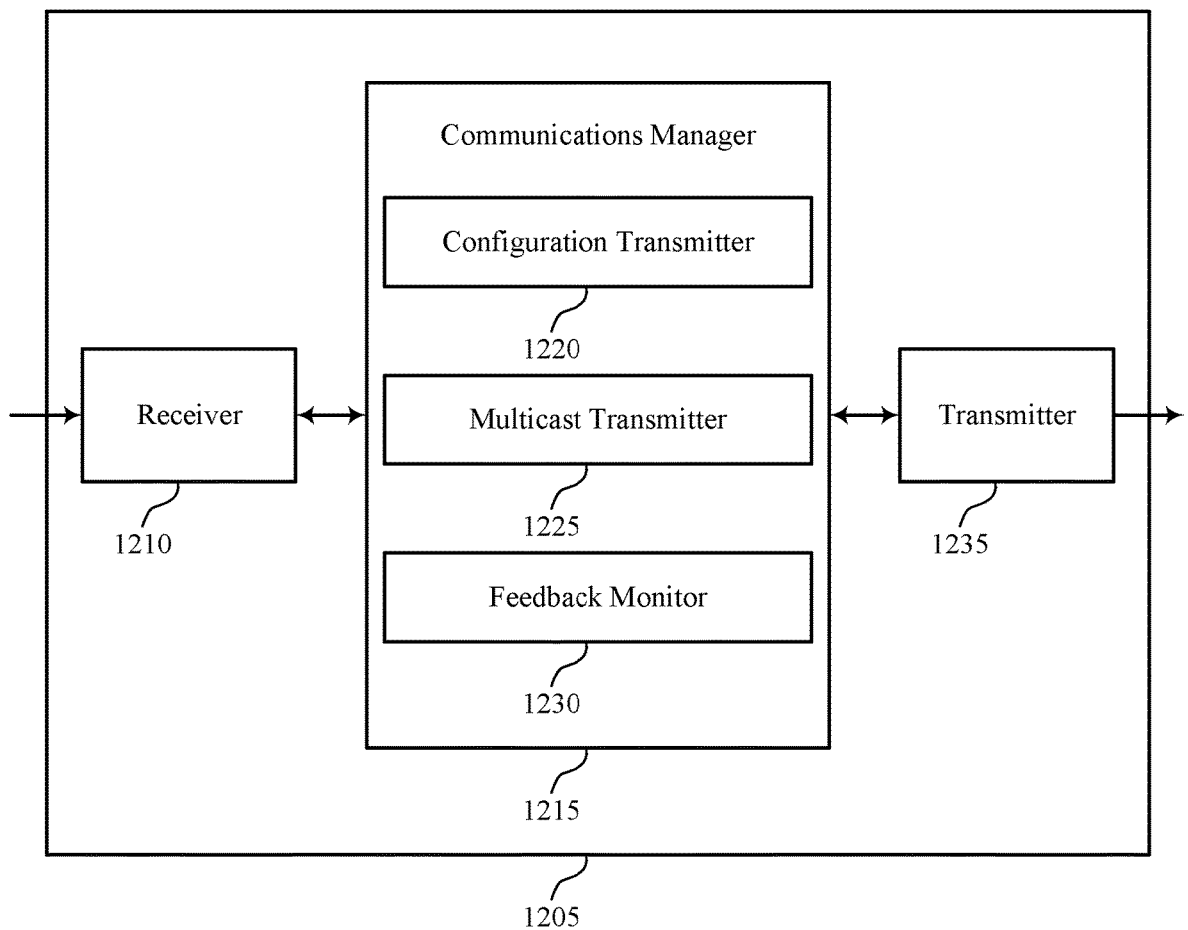

FIG. 12 shows a block diagram of a device 1205 that supports feedback for multicast transmissions in accordance with aspects of the present disclosure. The device 1205 may be an example of aspects of a device 1105, or a base station 105. The device 1205 may include a receiver 1210, a communications manager 1215, and a transmitter 1235. The communications manager 1215 may be implemented, at least in part, by one or both of a modem and a processor. Each of these components may be in communication with one another (for example, via one or more buses).

The receiver 1210 may receive information such as packets, user data, or control information associated with various information channels (for example, control channels, data channels, and information related to feedback for multicast transmissions). Information may be passed on to other components of the device 1205. The receiver 1210 may be an example of aspects of the transceiver described with reference to FIG. 12. The receiver 1210 may utilize a single antenna or a set of antennas.

The communications manager 1215 may be an example of aspects of the communications manager 1115. The communications manager 1215 may include a configuration transmitter 1220, a multicast transmitter 1225, and a feedback monitor 1230. The communications manager 1215 may be an example of aspects of the other communications managers described herein.

The configuration transmitter 1220 may transmit, to a UE, one or more configurations for multicast feedback by the UE in an inactive mode or an idle mode.

The multicast transmitter 1225 may transmit one or more multicast transmissions via a set of time-frequency resources configured for multicast communications.

The feedback monitor 1230 may monitor, based on transmitting the one or more multicast transmissions, for one or more multicast feedback messages from the UE in accordance with the one or more configurations.

The transmitter 1235 may transmit signals generated by other components of the device 1205. In some examples, the transmitter 1235 may be collocated with a receiver 1210 in a transceiver component. For example, the transmitter 1235 may be an example of aspects of the transceiver described with reference to FIG. 12. The transmitter 1235 may utilize a single antenna or a set of antennas.

Figure 13:
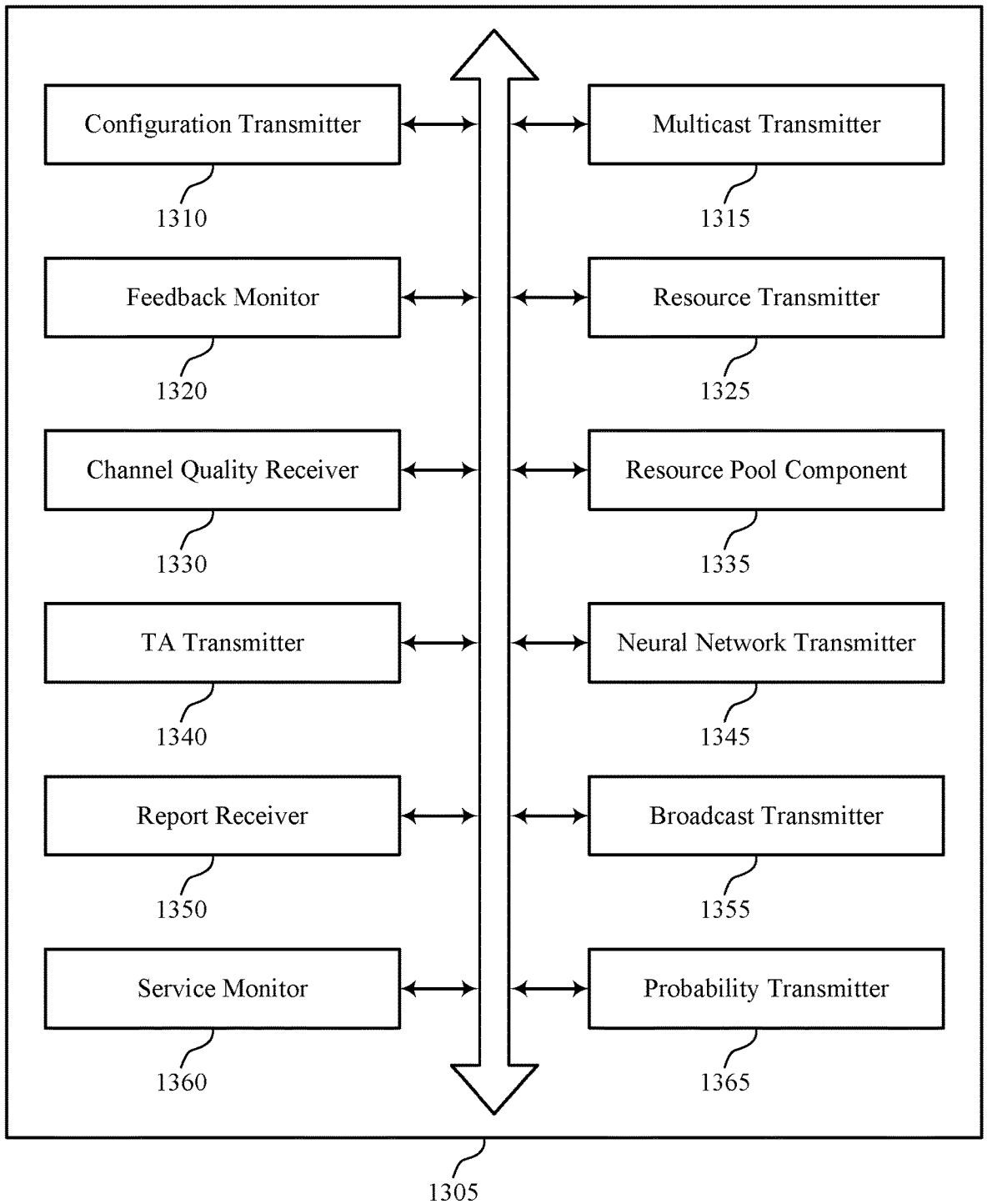
FIG. 13 shows a diagram of a communications manager that supports feedback for multicast transmissions in accordance with aspects of the present disclosure.

FIG. 13 shows a block diagram of a communications manager 1305 that supports feedback for multicast transmissions in accordance with aspects of the present disclosure. The communications manager 1305 may include a configuration transmitter 1310, a multicast transmitter 1315, a feedback monitor 1320, a resource transmitter 1325, a channel quality receiver 1330, a resource pool component 1335, a TA transmitter 1340, a neural network transmitter 1345, a report receiver 1350, a broadcast transmitter 1355, a service monitor 1360, and a probability transmitter 1365. Each of these components may communicate, directly or indirectly, with one another (for example, via one or more buses).

The configuration transmitter 1310 may transmit, to a UE, one or more configurations for multicast feedback by the UE in an inactive mode or an idle mode. In some examples, the configuration transmitter 1310 may transmit system information or a multicast control channel that indicates the one or more configurations.

The multicast transmitter 1315 may transmit one or more multicast transmissions via a set of time-frequency resources configured for multicast communications.

The feedback monitor 1320 may monitor, based on transmitting the one or more multicast transmissions, for one or more multicast feedback messages from the UE in accordance with the one or more configurations. In some examples, the feedback monitor 1320 may monitor the set of RACH resources for the one or more multicast feedback messages. In some aspects, the feedback monitor 1320 may monitor for the one or more multicast feedback messages based on the set of RACH preambles. In some implementations, the feedback monitor 1320 may receive the one or more multicast feedback messages via a subset of time-frequency resources of the resource pool based on the monitoring. In some examples, the feedback monitor 1320 may monitor the set of PUCCH resources for the one or more multicast feedback messages.

In some examples, the feedback monitor 1320 may receive, based on the monitoring, the one or more multicast feedback messages according to the timing advance based on a set of channel metrics at the UE satisfying the first set of values or according to the second timing advance based on a set of channel metrics at the UE satisfying the second set of values. In some aspects, the feedback monitor 1320 may receive the one or more multicast feedback messages via the set of uplink resources. In some implementations, the feedback monitor 1320 may receive, from the UE in the inactive mode or the idle mode, the one or more multicast feedback messages based on the timing advance, the timing advance based on the one or more neural network parameters. In some examples, the feedback monitor 1320 may receive the one or more multicast feedback messages based on the monitoring, in which the one or more multicast feedback messages includes a negative acknowledgement feedback message. In some aspects, the feedback monitor 1320 may receive the one or more multicast feedback messages based on the monitoring, in which the one or more multicast feedback messages includes an acknowledgement feedback message.

The resource transmitter 1325 may transmit an indication of a set of RACH resources available for multicast feedback in the one or more configurations. In some examples, the resource transmitter 1325 may transmit an indication of a set of RACH preambles available for multicast feedback in the one or more configurations. In some implementations, the resource transmitter 1325 may transmit an indication of the resource pool in the one or more configurations. In some examples, the resource transmitter 1325 may transmit an indication of a set of PUCCH resources available for multicast feedback in the one or more configurations. In some aspects, the resource transmitter 1325 may transmit an indication of the set of uplink resources in the one or more configurations.

The channel quality receiver 1330 may receive, from the UE, channel quality information associated with a multicast channel used for multicast communications with the UE. In some examples, the channel quality information includes one or more of reference signal received power, beam direction, beam width, geographical location, or altitude and azimuth values associated with one or more beams. In some aspects, the one or more channel metrics includes one or more of a reference signal received power, a relative delay between the serving cell and one or more other cells, or a positioning range of the UE.

The resource pool component 1335 may determine a resource pool for multicast feedback for the UE based on the channel quality information. In some examples, the resource pool component 1335 may determine a set of uplink resources available for a reception status report associated with multicast transmissions from the base station.

The TA transmitter 1340 may transmit a timing advance command to the UE, the timing advance command indicating a timing advance for the UE in the inactive mode or the idle mode, in which the timing advance command corresponds to first set of values for one or more channel metrics associated with the UE and associated with one or more cells including a serving cell for the UE.

In some examples, the TA transmitter 1340 may transmit a second timing advance command to the UE, the second timing advance command indicating a second timing advance for the UE in the inactive mode or the idle mode, in which the second timing advance command corresponds to second set of values for one or more channel metrics associated with the UE and associated with one or more cells including the serving cell for the UE. In some implementations, the TA transmitter 1340 may transmit one or more of the timing advance command or the second timing advance command in the one or more configurations, in which the one or more configurations indicates a set of uplink resources for multicast feedback.

The neural network transmitter 1345 may transmit a set of neural network parameters to the UE, in which the set of neural network parameters indicate the timing advance. In some examples, the neural network transmitter 1345 may transmit, to the UE in a connected mode, a neural network model and a set of neural network parameters associated with a neural network for a timing advance. In some examples, the neural network transmitter 1345 may transmit one or more neural network parameters to the UE.

The report receiver 1350 may receive the reception status report from the UE over the set of uplink resources. In some examples, the report receiver 1350 may receive, in the reception status report, a quantity of physical control channels for multicast transmissions received by the UE. In some examples, the report receiver 1350 may receive, in the reception status report, a ratio between the quantity of the physical control channels for multicast transmissions received by the UE and a total quantity of physical control channels for multicast transmissions transmitted over multiple time occasions of the set of uplink control channel resources. In some implementations, the set of uplink resources includes RACH resources or uplink control channel resources.

The broadcast transmitter 1355 may transmit a broadcast message indicating a counting duration for a service of multicast transmissions supported by the base station.

The service monitor 1360 may monitor, during the counting duration, for one or more messages from the UE requesting the service of multicast transmissions supported by the base station. In some examples, the service monitor 1360 may receive the one or more the messages based on an identifier of the UE. In some examples, the service monitor 1360 may receive the one or more the messages based on the probability indicator of the UE. In some implementations, the one or more messages includes an uplink control channel message or a RACH message.

The probability transmitter 1365 may transmit, to the UE, a probability indicator for the UE.

Figure 14:
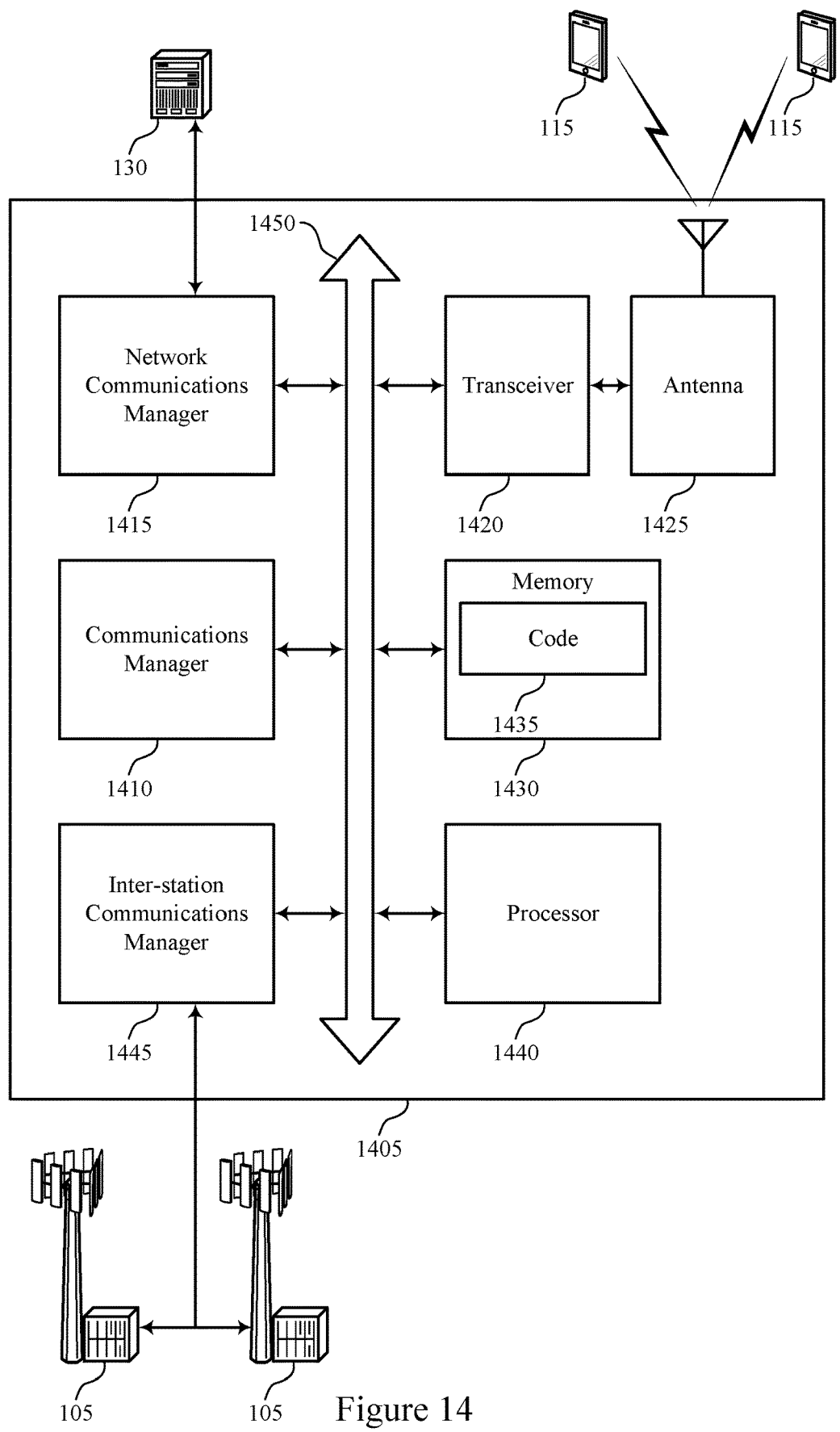
FIG. 14 shows a diagram of a system including a device that supports feedback for multicast transmissions in accordance with aspects of the present disclosure.

FIG. 14 shows a diagram of a system including a device 1405 that supports feedback for multicast transmissions in accordance with aspects of the present disclosure. The device 1405 may be an example of or include the components of device 1105, device 1205, or a base station 105. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (for example, bus 1450).

The communications manager 1410 may transmit, to a UE, one or more configurations for multicast feedback by the UE in an inactive mode or an idle mode, transmit one or more multicast transmissions via a set of time-frequency resources configured for multicast communications, and monitor, based on transmitting the one or more multicast transmissions, for one or more multicast feedback messages from the UE in accordance with the one or more configurations.

The network communications manager 1415 may manage communications with the core network (for example, via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some implementations, the device 1405 may include a single antenna 1425, or the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (for example, the processor 1440) cause the device to perform various functions described herein. In some implementations, the memory 1430 may contain, among other things, a BIOS which may control basic hardware or software operation such as the interaction with peripheral components or devices.

The processor 1440 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 1440 may be configured to operate a memory array using a memory controller. In some implementations, a memory controller may be integrated into processor 1440. The processor 1440 may be configured to execute computer-readable instructions stored in a memory (for example, the memory 1430) to cause the device 1405 to perform various functions (for example, functions or tasks supporting feedback for multicast transmissions).

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some implementations, the code 1435 may not be directly executable by the processor 1440 but may cause a computer (for example, when compiled and executed) to perform functions described herein.

Figure 15:
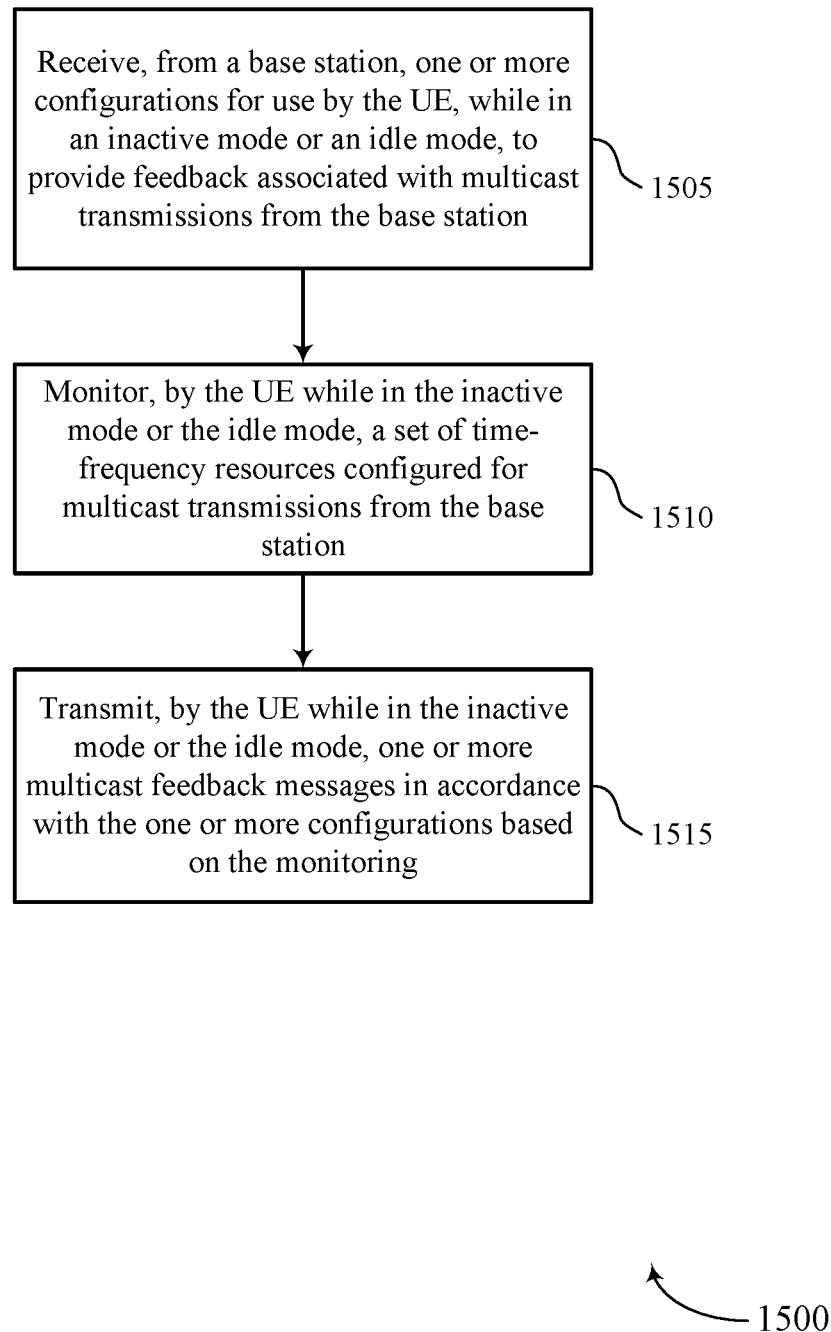
FIGS. 15-23 show flowcharts illustrating methods that support feedback for multicast transmissions in accordance with aspects of the present disclosure.

FIG. 15 shows a flowchart illustrating a method 1500 that supports feedback for multicast transmissions in accordance with aspects of the present disclosure. The operations of method 1500 may be implemented by a UE 115 or its components. For example, the operations of method 1500 may be performed by a communications manager as described with reference to FIGS. 7-10. In some examples, a UE may execute a set of instructions to control the functional elements of the UE to perform the functions described below. Additionally, or alternatively, a UE may perform aspects of the functions described below using special-purpose hardware.

At 1505, the UE may receive, from a base station, one or more configurations for use by the UE, while in an inactive mode or an idle mode, to provide feedback associated with multicast transmissions from the base station. The operations of 1505 may be performed according to the methods described herein. In some examples, aspects of the operations of 1505 may be performed by a configuration receiver as described with reference to FIGS. 7-10.

At 1510, the UE may monitor, by the UE while in the inactive mode or the idle mode, a set of time-frequency resources configured for multicast transmissions from the base station. The operations of 1510 may be performed according to the methods described herein. In some examples, aspects of the operations of 1510 may be performed by a multicast monitor as described with reference to FIGS. 7-10.

At 1515, the UE may transmit, by the UE while in the inactive mode or the idle mode, one or more multicast feedback messages in accordance with the one or more configurations based on the monitoring. The operations of 1515 may be performed according to the methods described herein. In some examples, aspects of the operations of 1515 may be performed by a feedback transmitter as described with reference to FIGS. 7-10.

Figure 16:
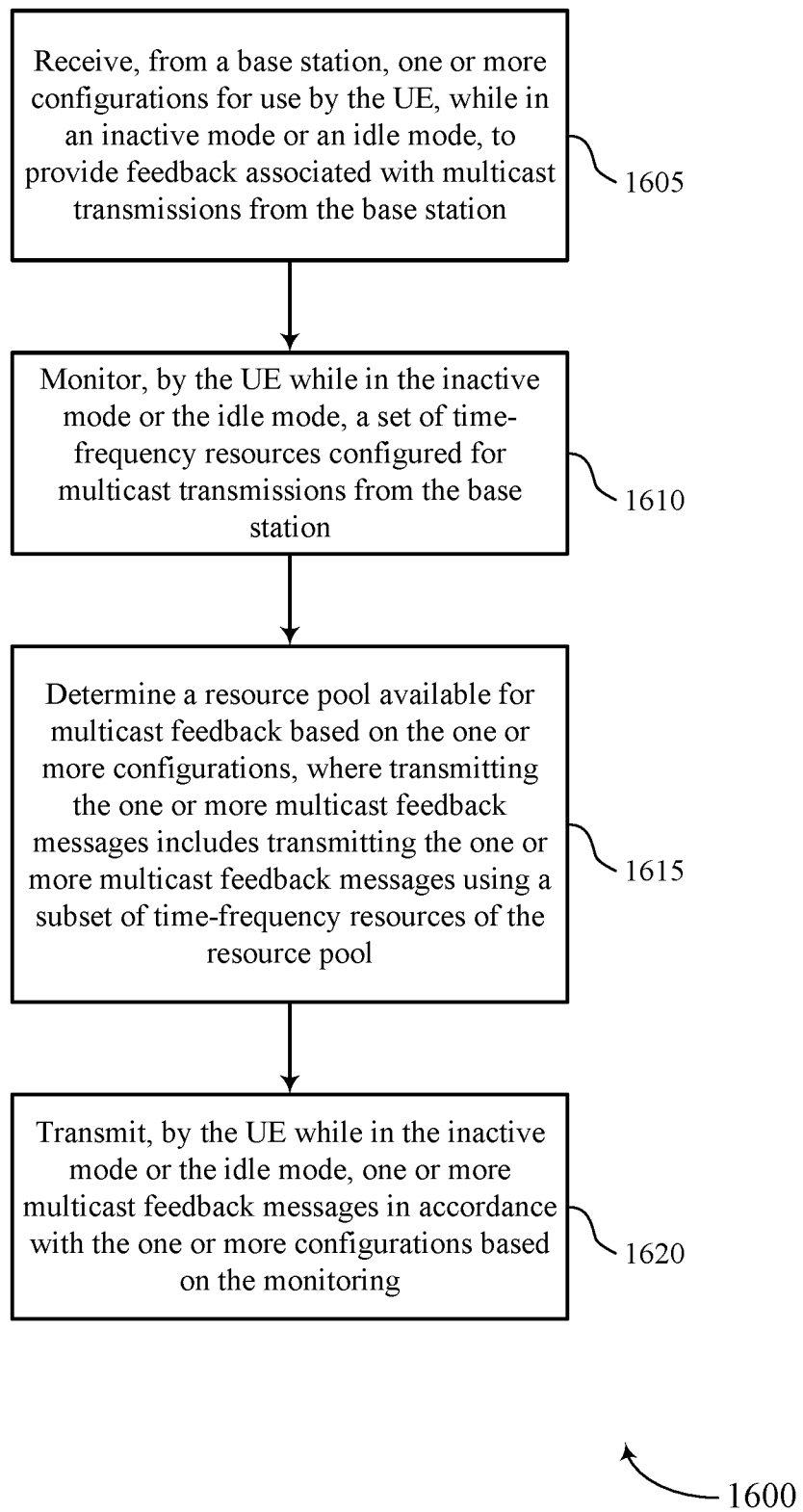

FIG. 16 shows a flowchart illustrating a method 1600 that supports feedback for multicast transmissions in accordance with aspects of the present disclosure. The operations of method 1600 may be implemented by a UE 115 or its components. For example, the operations of method 1600 may be performed by a communications manager as described with reference to FIGS. 7-10. In some examples, a UE may execute a set of instructions to control the functional elements of the UE to perform the functions described below. Additionally, or alternatively, a UE may perform aspects of the functions described below using special-purpose hardware.

At 1605, the UE may receive, from a base station, one or more configurations for use by the UE, while in an inactive mode or an idle mode, to provide feedback associated with multicast transmissions from the base station. The operations of 1605 may be performed according to the methods described herein. In some examples, aspects of the operations of 1605 may be performed by a configuration receiver as described with reference to FIGS. 7-10.

At 1610, the UE may monitor, by the UE while in the inactive mode or the idle mode, a set of time-frequency resources configured for multicast transmissions from the base station. The operations of 1610 may be performed according to the methods described herein. In some examples, aspects of the operations of 1610 may be performed by a multicast monitor as described with reference to FIGS. 7-10.

At 1615, the UE may determine a resource pool available for multicast feedback based on the one or more configurations, in which transmitting the one or more multicast feedback messages includes transmitting the one or more multicast feedback messages using a subset of time-frequency resources of the resource pool. The operations of 1615 may be performed according to the methods described herein. In some examples, aspects of the operations of 1615 may be performed by a resource manager as described with reference to FIGS. 7-10.

At 1620, the UE may transmit, by the UE while in the inactive mode or the idle mode, one or more multicast feedback messages in accordance with the one or more configurations based on the monitoring. The operations of 1620 may be performed according to the methods described herein. In some examples, aspects of the operations of 1620 may be performed by a feedback transmitter as described with reference to FIGS. 7-10.

Figure 17:
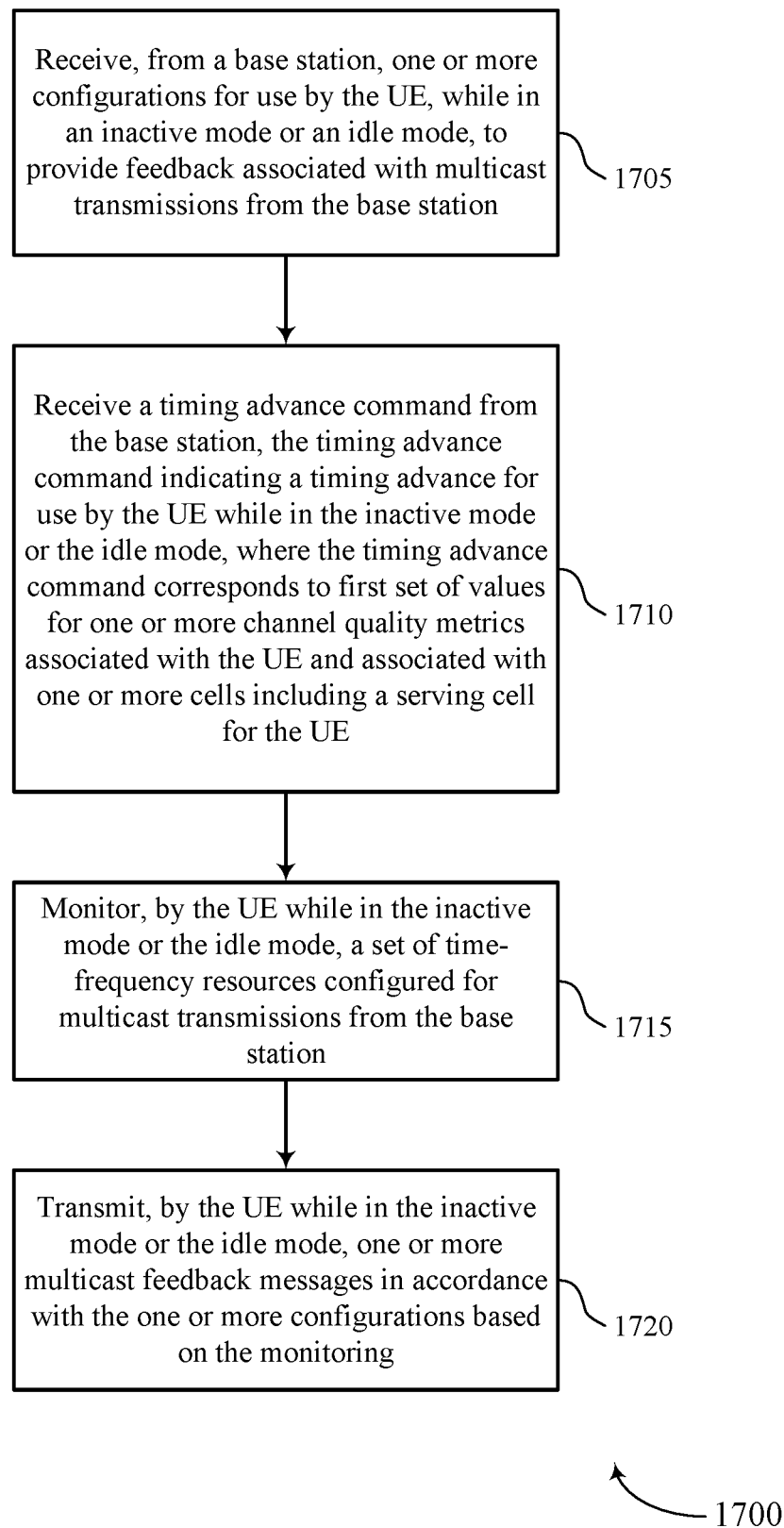

FIG. 17 shows a flowchart illustrating a method 1700 that supports feedback for multicast transmissions in accordance with aspects of the present disclosure. The operations of method 1700 may be implemented by a UE 115 or its components. For example, the operations of method 1700 may be performed by a communications manager as described with reference to FIGS. 7-10. In some examples, a UE may execute a set of instructions to control the functional elements of the UE to perform the functions described below. Additionally, or alternatively, a UE may perform aspects of the functions described below using special-purpose hardware.

At 1705, the UE may receive, from a base station, one or more configurations for use by the UE, while in an inactive mode or an idle mode, to provide feedback associated with multicast transmissions from the base station. The operations of 1705 may be performed according to the methods described herein. In some examples, aspects of the operations of 1705 may be performed by a configuration receiver as described with reference to FIGS. 7-10.

At 1710, the UE may receive a timing advance command from the base station, the timing advance command indicating a timing advance for use by the UE while in the inactive mode or the idle mode, in which the timing advance command corresponds to first set of values for one or more channel metrics associated with the UE and associated with one or more cells including a serving cell for the UE. The operations of 1710 may be performed according to the methods described herein. In some examples, aspects of the operations of 1710 may be performed by a TA receiver as described with reference to FIGS. 7-10.

At 1715, the UE may monitor, by the UE while in the inactive mode or the idle mode, a set of time-frequency resources configured for multicast transmissions from the base station. The operations of 1715 may be performed according to the methods described herein. In some examples, aspects of the operations of 1715 may be performed by a multicast monitor as described with reference to FIGS. 7-10.

At 1720, the UE may transmit, by the UE while in the inactive mode or the idle mode, one or more multicast feedback messages in accordance with the one or more configurations based on the monitoring. The operations of 1720 may be performed according to the methods described herein. In some examples, aspects of the operations of 1720 may be performed by a feedback transmitter as described with reference to FIGS. 7-10.

Figure 18:
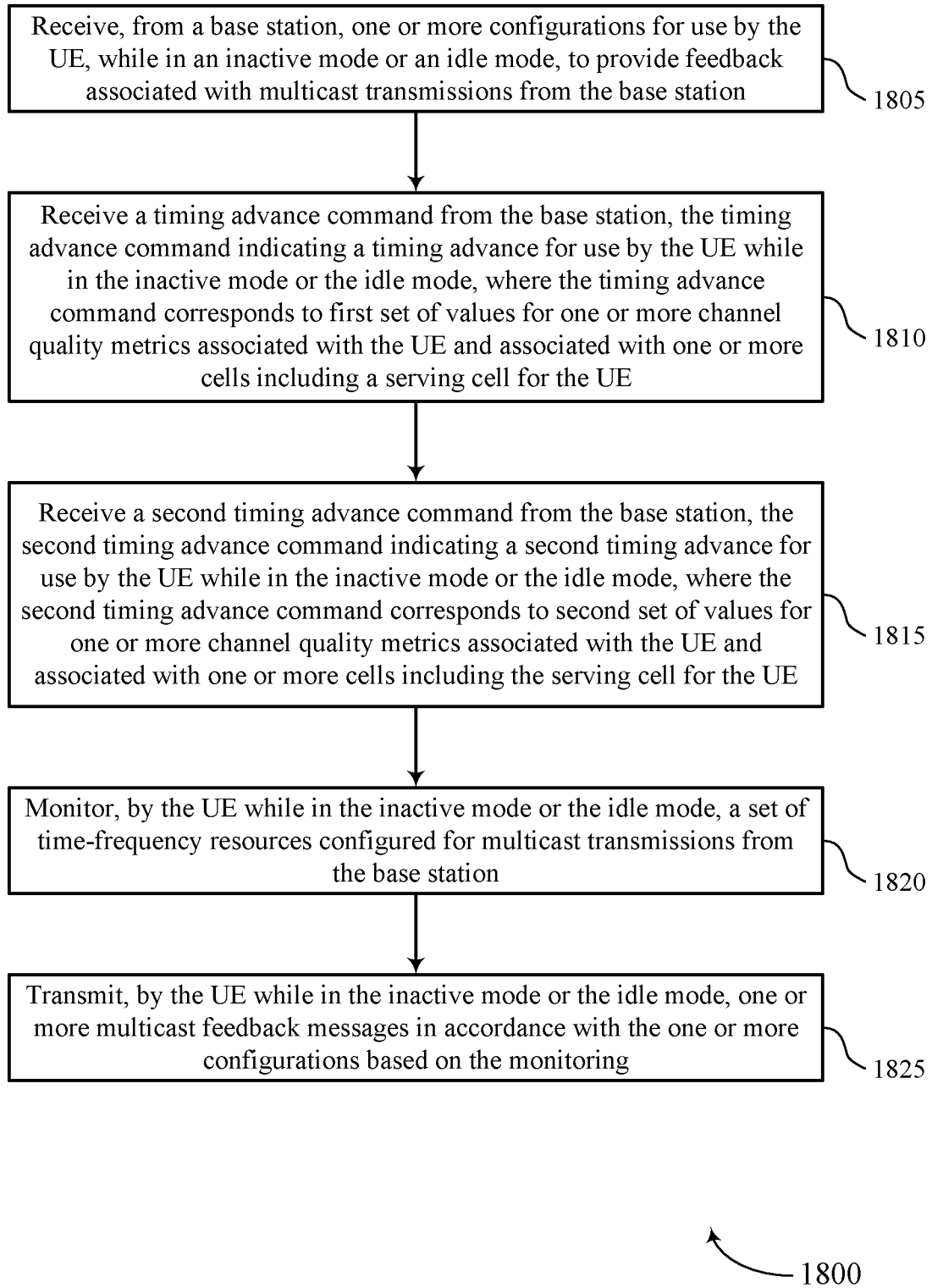

FIG. 18 shows a flowchart illustrating a method 1800 that supports feedback for multicast transmissions in accordance with aspects of the present disclosure. The operations of method 1800 may be implemented by a UE 115 or its components. For example, the operations of method 1800 may be performed by a communications manager as described with reference to FIGS. 7-10. In some examples, a UE may execute a set of instructions to control the functional elements of the UE to perform the functions described below. Additionally, or alternatively, a UE may perform aspects of the functions described below using special-purpose hardware.

At 1805, the UE may receive, from a base station, one or more configurations for use by the UE, while in an inactive mode or an idle mode, to provide feedback associated with multicast transmissions from the base station. The operations of 1805 may be performed according to the methods described herein. In some examples, aspects of the operations of 1805 may be performed by a configuration receiver as described with reference to FIGS. 7-10.

At 1810, the UE may receive a timing advance command from the base station, the timing advance command indicating a timing advance for use by the UE while in the inactive mode or the idle mode, in which the timing advance command corresponds to first set of values for one or more channel metrics associated with the UE and associated with one or more cells including a serving cell for the UE. The operations of 1810 may be performed according to the methods described herein. In some examples, aspects of the operations of 1810 may be performed by a TA receiver as described with reference to FIGS. 7-10.

At 1815, the UE may receive a second timing advance command from the base station, the second timing advance command indicating a second timing advance for use by the UE while in the inactive mode or the idle mode, in which the second timing advance command corresponds to second set of values for one or more channel metrics associated with the UE and associated with one or more cells including the serving cell for the UE. The operations of 1815 may be performed according to the methods described herein. In some examples, aspects of the operations of 1815 may be performed by a TA receiver as described with reference to FIGS. 7-10.

At 1820, the UE may monitor, by the UE while in the inactive mode or the idle mode, a set of time-frequency resources configured for multicast transmissions from the base station. The operations of 1820 may be performed according to the methods described herein. In some examples, aspects of the operations of 1820 may be performed by a multicast monitor as described with reference to FIGS. 7-10.

At 1825, the UE may transmit, by the UE while in the inactive mode or the idle mode, one or more multicast feedback messages in accordance with the one or more configurations based on the monitoring. The operations of 1825 may be performed according to the methods described herein. In some examples, aspects of the operations of 1825 may be performed by a feedback transmitter as described with reference to FIGS. 7-10.

Figure 19:
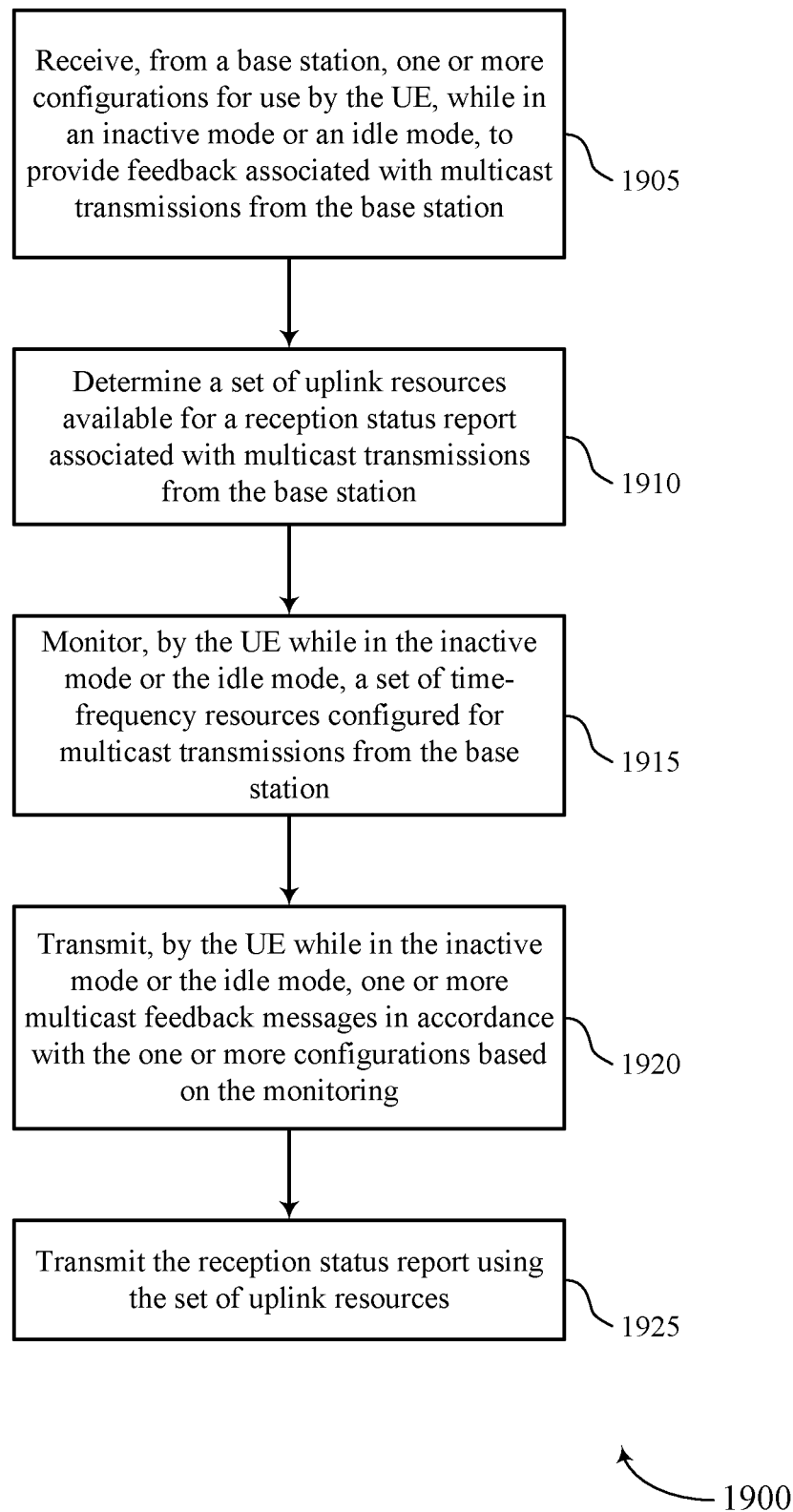

FIG. 19 shows a flowchart illustrating a method 1900 that supports feedback for multicast transmissions in accordance with aspects of the present disclosure. The operations of method 1900 may be implemented by a UE 115 or its components. For example, the operations of method 1900 may be performed by a communications manager as described with reference to FIGS. 7-10. In some examples, a UE may execute a set of instructions to control the functional elements of the UE to perform the functions described below. Additionally, or alternatively, a UE may perform aspects of the functions described below using special-purpose hardware.

At 1905, the UE may receive, from a base station, one or more configurations for use by the UE, while in an inactive mode or an idle mode, to provide feedback associated with multicast transmissions from the base station. The operations of 1905 may be performed according to the methods described herein. In some examples, aspects of the operations of 1905 may be performed by a configuration receiver as described with reference to FIGS. 7-10.

At 1910, the UE may determine a set of uplink resources available for a reception status report associated with multicast transmissions from the base station. The operations of 1910 may be performed according to the methods described herein. In some examples, aspects of the operations of 1910 may be performed by a resource manager as described with reference to FIGS. 7-10.

At 1915, the UE may monitor, by the UE while in the inactive mode or the idle mode, a set of time-frequency resources configured for multicast transmissions from the base station. The operations of 1915 may be performed according to the methods described herein. In some examples, aspects of the operations of 1915 may be performed by a multicast monitor as described with reference to FIGS. 7-10.

At 1920, the UE may transmit, by the UE while in the inactive mode or the idle mode, one or more multicast feedback messages in accordance with the one or more configurations based on the monitoring. The operations of 1920 may be performed according to the methods described herein. In some examples, aspects of the operations of 1920 may be performed by a feedback transmitter as described with reference to FIGS. 7-10.

At 1925, the UE may transmit the reception status report using the set of uplink resources. The operations of 1925 may be performed according to the methods described herein. In some examples, aspects of the operations of 1925 may be performed by a status report transmitter as described with reference to FIGS. 7-10.

Figure 20:
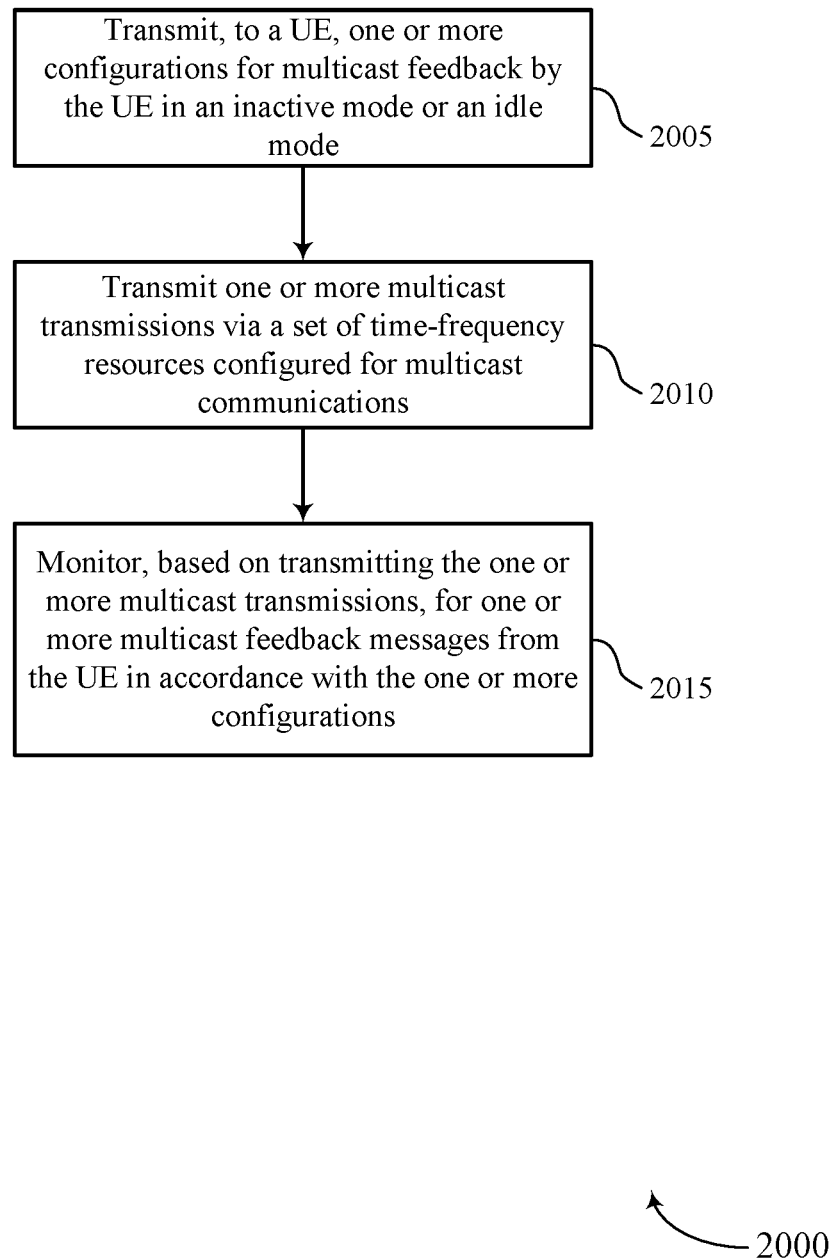

FIG. 20 shows a flowchart illustrating a method 2000 that supports feedback for multicast transmissions in accordance with aspects of the present disclosure. The operations of method 2000 may be implemented by a base station 105 or its components. For example, the operations of method 2000 may be performed by a communications manager as described with reference to FIGS. 11-14. In some examples, a base station may execute a set of instructions to control the functional elements of the base station to perform the functions described below. Additionally, or alternatively, a base station may perform aspects of the functions described below using special-purpose hardware.

At 2005, the base station may transmit, to a UE, one or more configurations for multicast feedback by the UE in an inactive mode or an idle mode. The operations of 2005 may be performed according to the methods described herein. In some examples, aspects of the operations of 2005 may be performed by a configuration transmitter as described with reference to FIGS. 11-14.

At 2010, the base station may transmit one or more multicast transmissions via a set of time-frequency resources configured for multicast communications. The operations of 2010 may be performed according to the methods described herein. In some examples, aspects of the operations of 2010 may be performed by a multicast transmitter as described with reference to FIGS. 11-14.

At 2015, the base station may monitor, based on transmitting the one or more multicast transmissions, for one or more multicast feedback messages from the UE in accordance with the one or more configurations. The operations of 2015 may be performed according to the methods described herein. In some examples, aspects of the operations of 2015 may be performed by a feedback monitor as described with reference to FIGS. 11-14.

Figure 21:
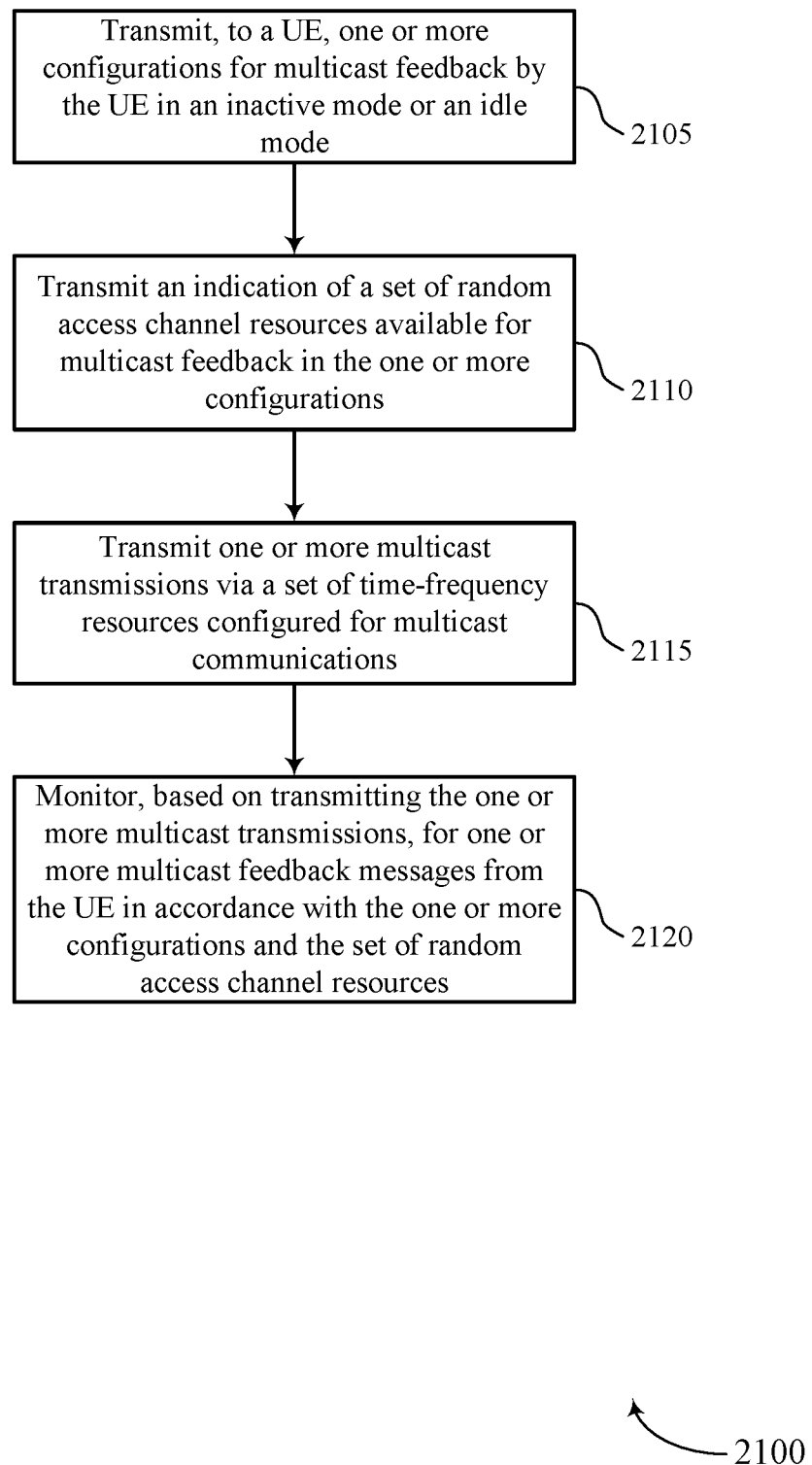

FIG. 21 shows a flowchart illustrating a method 2100 that supports feedback for multicast transmissions in accordance with aspects of the present disclosure. The operations of method 2100 may be implemented by a base station 105 or its components. For example, the operations of method 2100 may be performed by a communications manager as described with reference to FIGS. 11-14. In some examples, a base station may execute a set of instructions to control the functional elements of the base station to perform the functions described below. Additionally, or alternatively, a base station may perform aspects of the functions described below using special-purpose hardware.

At 2105, the base station may transmit, to a UE, one or more configurations for multicast feedback by the UE in an inactive mode or an idle mode. The operations of 2105 may be performed according to the methods described herein. In some examples, aspects of the operations of 2105 may be performed by a configuration transmitter as described with reference to FIGS. 11-14.

At 2110, the base station may transmit an indication of a set of RACH resources available for multicast feedback in the one or more configurations. The operations of 2110 may be performed according to the methods described herein. In some examples, aspects of the operations of 2110 may be performed by a resource transmitter as described with reference to FIGS. 11-14.

At 2115, the base station may transmit one or more multicast transmissions via a set of time-frequency resources configured for multicast communications. The operations of 2115 may be performed according to the methods described herein. In some examples, aspects of the operations of 2115 may be performed by a multicast transmitter as described with reference to FIGS. 11-14.

At 2120, the base station may monitor, based on transmitting the one or more multicast transmissions, for one or more multicast feedback messages from the UE in accordance with the one or more configurations and the set of RACH resources. The operations of 2120 may be performed according to the methods described herein. In some examples, aspects of the operations of 2120 may be performed by a feedback monitor as described with reference to FIGS. 11-14.

Figure 22:
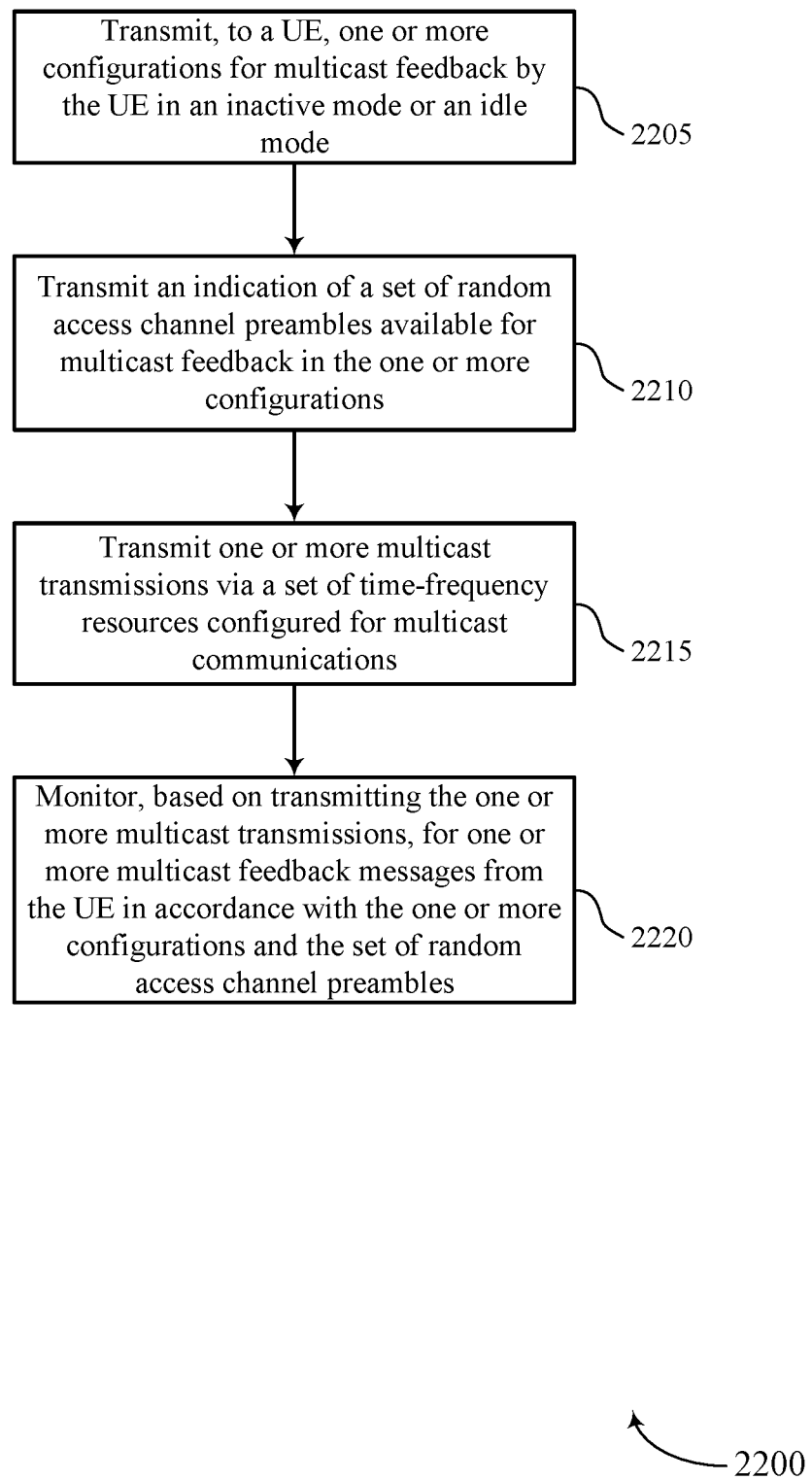

FIG. 22 shows a flowchart illustrating a method 2200 that supports feedback for multicast transmissions in accordance with aspects of the present disclosure. The operations of method 2200 may be implemented by a base station 105 or its components. For example, the operations of method 2200 may be performed by a communications manager as described with reference to FIGS. 11-14. In some examples, a base station may execute a set of instructions to control the functional elements of the base station to perform the functions described below. Additionally, or alternatively, a base station may perform aspects of the functions described below using special-purpose hardware.

At 2205, the base station may transmit, to a UE, one or more configurations for multicast feedback by the UE in an inactive mode or an idle mode. The operations of 2205 may be performed according to the methods described herein. In some examples, aspects of the operations of 2205 may be performed by a configuration transmitter as described with reference to FIGS. 11-14.

At 2210, the base station may transmit an indication of a set of RACH preambles available for multicast feedback in the one or more configurations. The operations of 2210 may be performed according to the methods described herein. In some examples, aspects of the operations of 2210 may be performed by a resource transmitter as described with reference to FIGS. 11-14.

At 2215, the base station may transmit one or more multicast transmissions via a set of time-frequency resources configured for multicast communications. The operations of 2215 may be performed according to the methods described herein. In some examples, aspects of the operations of 2215 may be performed by a multicast transmitter as described with reference to FIGS. 11-14.

At 2220, the base station may monitor, based on transmitting the one or more multicast transmissions, for one or more multicast feedback messages from the UE in accordance with the one or more configurations and the set of RACH preambles. The operations of 2220 may be performed according to the methods described herein. In some examples, aspects of the operations of 2220 may be performed by a feedback monitor as described with reference to FIGS. 11-14.

Figure 23:
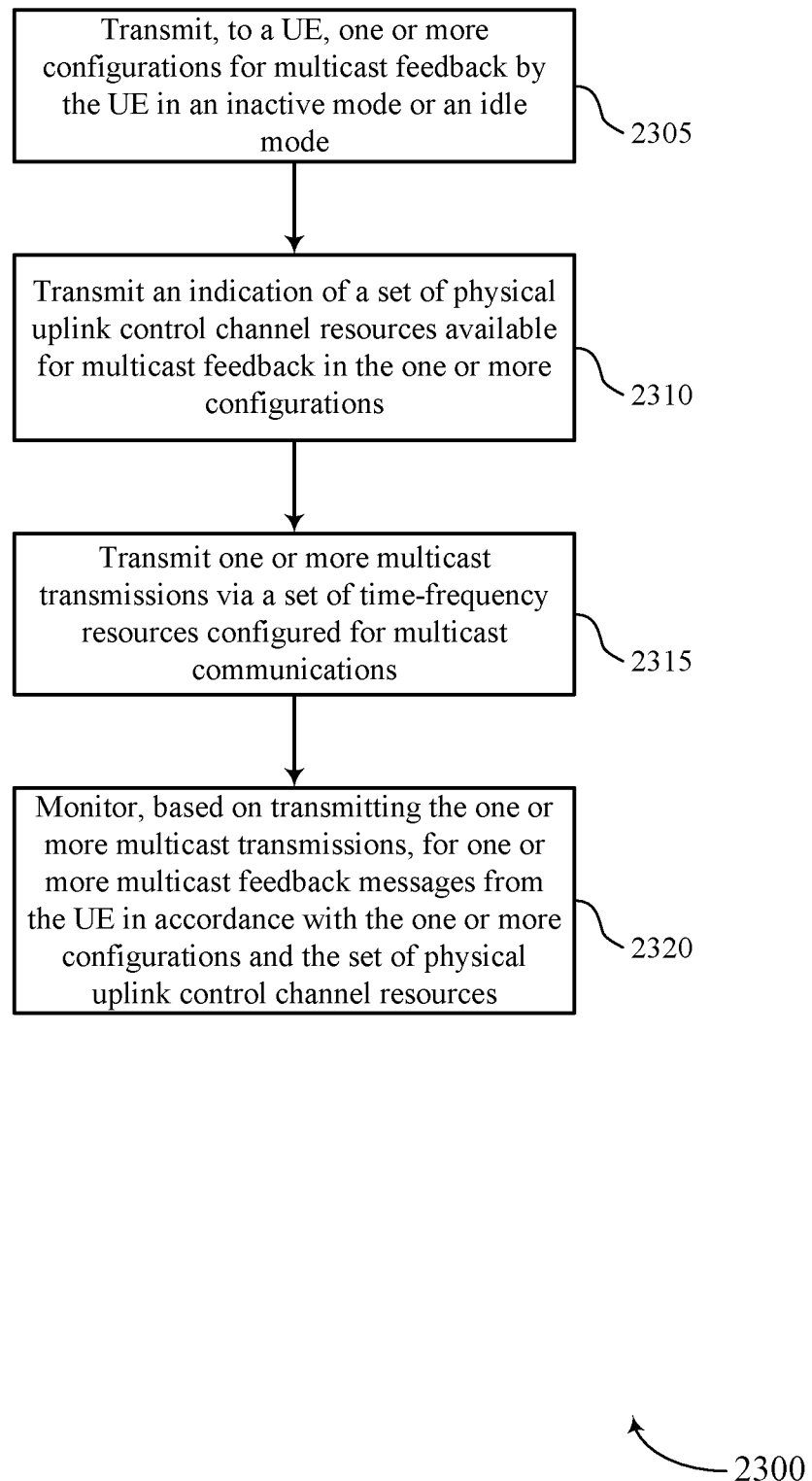

FIG. 23 shows a flowchart illustrating a method 2300 that supports feedback for multicast transmissions in accordance with aspects of the present disclosure. The operations of method 2300 may be implemented by a base station 105 or its components. For example, the operations of method 2300 may be performed by a communications manager as described with reference to FIGS. 11-14. In some examples, a base station may execute a set of instructions to control the functional elements of the base station to perform the functions described below. Additionally, or alternatively, a base station may perform aspects of the functions described below using special-purpose hardware.

At 2305, the base station may transmit, to a UE, one or more configurations for multicast feedback by the UE in an inactive mode or an idle mode. The operations of 2305 may be performed according to the methods described herein. In some examples, aspects of the operations of 2305 may be performed by a configuration transmitter as described with reference to FIGS. 11-14.

At 2310, the base station may transmit an indication of a set of PUCCH resources available for multicast feedback in the one or more configurations. The operations of 2310 may be performed according to the methods described herein. In some examples, aspects of the operations of 2310 may be performed by a resource transmitter as described with reference to FIGS. 11-14.

At 2315, the base station may transmit one or more multicast transmissions via a set of time-frequency resources configured for multicast communications. The operations of 2315 may be performed according to the methods described herein. In some examples, aspects of the operations of 2315 may be performed by a multicast transmitter as described with reference to FIGS. 11-14.

At 2320, the base station may monitor, based on transmitting the one or more multicast transmissions, for one or more multicast feedback messages from the UE in accordance with the one or more configurations and the set of PUCCH resources. The operations of 2320 may be performed according to the methods described herein. In some examples, aspects of the operations of 2320 may be performed by a feedback monitor as described with reference to FIGS. 11-14.

The following provides an overview of aspects of the present disclosure:

Aspect 1: A method for wireless communications at a UE, comprising: receiving, from a base station, one or more configurations for the UE to use, while in an inactive mode or an idle mode, to provide feedback associated with multicast transmissions from the base station; monitoring, by the UE while in the inactive mode or the idle mode, a set of time frequency resources configured for multicast transmissions from the base station; and transmitting, by the UE while in the inactive mode or the idle mode, one or more multicast feedback messages in accordance with the one or more configurations based at least in part on the monitoring.

Aspect 2: The method of aspect 1, further comprising determining a set of random access channel resources available for multicast feedback based at least in part on a resource allocation indicated by the one or more configurations, wherein transmitting the one or more multicast feedback messages comprises transmitting the one or more multicast feedback messages via the set of random access channel resources.

Aspect 3: The method of any of aspects 1 through 2, further comprising: determining a set of random access channel preambles available for multicast feedback based at least in part on a resource allocation indicated by the one or more configurations; and selecting a preamble of the set of random access channel preambles, wherein transmitting the one or more multicast feedback messages comprises transmitting the one or more multicast feedback messages using the selected preamble.

Aspect 4: The method of any of aspects 1 through 3, further comprising receiving a multicast message over the set of time frequency resources based at least in part on the monitoring, wherein selecting the preamble of the set of random access channel preambles comprises selecting the preamble based at least in part on a channel quality metric associated with the received multicast message.

Aspect 5: The method of any of aspects 1 through 4, further comprising: receiving a multicast message over the set of time frequency resources based at least in part on the monitoring; transmitting channel quality information associated with the received multicast message, wherein the channel quality information comprises one or more of reference signal received power, beam direction, beam width, geographical location, or altitude and azimuth values associated with one or more beams; and determining time frequency resources for multicast feedback based at least in part on the channel quality information, wherein transmitting the one or more multicast feedback messages comprises transmitting the one or more multicast feedback messages via the determined time frequency resources.

Aspect 6: The method of any of aspects 1 through 5, further comprising determining a resource pool available for multicast feedback based at least in part on the one or more configurations, wherein transmitting the one or more multicast feedback messages comprises transmitting the one or more multicast feedback messages using a subset of time frequency resources of the resource pool.

Aspect 7: The method of any of aspects 1 through 6, further comprising determining a set of physical uplink control channel resources available for multicast feedback based at least in part on the one or more configurations, wherein transmitting the one or more multicast feedback messages comprises transmitting the one or more multicast feedback messages using a subset of the physical uplink control channel resources.

Aspect 8: The method of aspect 7, further comprising: determining an uplink control format for the one or more multicast feedback messages; and padding a payload of the one or more multicast feedback messages based at least in part on a size associated with the uplink control format.

Aspect 9: The method of any of aspects 1 through 8, further comprising receiving a timing advance command from the base station, the timing advance command indicating a timing advance for the UE to use while in the inactive mode or the idle mode, wherein the timing advance command corresponds to first set of values for one or more channel metrics associated with the UE and associated with one or more cells including a serving cell for the UE.

Aspect 10: The method of aspect 9, further comprising receiving a second timing advance command from the base station, the second timing advance command indicating a second timing advance for the UE to use while in the inactive mode or the idle mode, wherein the second timing advance command corresponds to second set of values for one or more channel metrics associated with the UE and associated with one or more cells including the serving cell for the UE.

Aspect 11: The method of aspect 10, further comprising measuring a set of channel metrics of the one or more cells including the serving cell, wherein transmitting the one or more multicast feedback messages comprises transmitting the one or more multicast feedback messages using the timing advance based at least in part on the set of channel metrics satisfying the first set of values or using the second timing advance based at least in part on the set of channel metrics satisfying the second set of values.

Aspect 12: The method of any of aspects 10 through 11, wherein the one or more channel metrics comprise one or more of a reference signal received power, a relative delay between the serving cell and one or more other cells, or a positioning range of the UE.

Aspect 13: The method of any of aspects 10 through 12, further comprising receiving one or more of the timing advance command or the second timing advance command in the one or more configurations, the one or more configurations indicating a set of uplink resources for multicast feedback, wherein transmitting the one or more multicast feedback messages comprises transmitting the one or more multicast feedback messages using the set of uplink resources.

Aspect 14: The method of any of aspects 9 through 13, further comprising receiving a set of neural network parameters in the timing advance command from the base station, wherein the set of neural network parameters indicate the timing advance.

Aspect 15: The method of any of aspects 1 through 14, further comprising: receiving, at the UE while in a connected mode, a neural network model and a set of neural network parameters from the base station, the neural network model and the set of neural network parameters being associated with a neural network for a timing advance; receiving one or more neural network parameters from the base station; and determining the timing advance based at least in part on the neural network model, the set of neural network parameters, and the one or more neural network parameters, wherein transmitting the one or more multicast feedback messages comprises transmitting, by the UE while in the inactive mode or the idle mode, the one or more multicast feedback messages based at least in part on the timing advance.

Aspect 16: The method of any of aspects 1 through 15, further comprising: determining a set of uplink resources available for a reception status report associated with multicast transmissions from the base station, wherein the set of uplink resources comprises random access channel resources or uplink control channel resources; and transmitting the reception status report using the set of uplink resources.

Aspect 17: The method of aspect 16, further comprising: monitoring multiple time occasions for multicast transmissions from the base station; receiving a plurality of physical control channels for multicast transmissions based at least in part on the monitoring of the multiple time occasions; transmitting an indication of a quantity of the received plurality of physical control channels for multicast transmissions in the reception status report; and transmitting, in the reception status report, a ratio between the quantity of the received plurality of physical control channels for multicast transmissions and a total quantity of physical control channels for multicast transmissions scheduled over the multiple time occasions, wherein the total quantity of physical control channels for multicast transmissions corresponds to a set of uplink control channel resources.

Aspect 18: The method of any of aspects 1 through 17, further comprising: receiving a broadcast message from the base station indicating a counting duration for a service of the multicast transmissions supported by the base station; and transmitting a service request message over the counting duration requesting the service of the multicast transmissions supported by the base station based at least in part on an identifier of the UE.

Aspect 19: The method of aspect 18, further comprising receiving, from the base station, a probability indicator for the UE, wherein transmitting the service request message comprises transmitting the message in accordance with the probability indicator.

Aspect 20: A method for wireless communications at a base station, comprising: transmitting, to a UE, one or more configurations for multicast feedback for use by the UE while in an inactive mode or an idle mode; transmitting one or more multicast transmissions via a set of time frequency resources configured for multicast communications; and monitoring, based at least in part on transmitting the one or more multicast transmissions, for one or more multicast feedback messages from the UE in accordance with the one or more configurations.

Aspect 21: The method of aspect 20, further comprising: transmitting an indication of a set of random access channel resources available for multicast feedback in the one or more configurations; and monitoring the set of random access channel resources for the one or more multicast feedback messages.

Aspect 22: The method of any of aspects 20 through 21, further comprising: transmitting an indication of a set of random access channel preambles available for multicast feedback in the one or more configurations; and monitoring for the one or more multicast feedback messages based at least in part on the set of random access channel preambles.

Aspect 23: The method of any of aspects 20 through 22, further comprising: receiving, from the UE, channel quality information associated with a multicast channel used for multicast communications with the UE, wherein the channel quality information comprises one or more of reference signal received power, beam direction, beam width, geographical location, or altitude and azimuth values associated with one or more beams; determining a resource pool for multicast feedback for the UE based at least in part on the channel quality information; and transmitting an indication of the resource pool in the one or more configurations.

Aspect 24: The method of aspect 23, further comprising receiving the one or more multicast feedback messages via a subset of time frequency resources of the resource pool based at least in part on the monitoring.

Aspect 25: The method of any of aspects 20 through 24, further comprising: transmitting an indication of a set of physical uplink control channel resources available for multicast feedback in the one or more configurations; and monitoring the set of physical uplink control channel resources for the one or more multicast feedback messages.

Aspect 26: The method of any of aspects 20 through 25, further comprising transmitting a timing advance command to the UE, the timing advance command indicating a timing advance for the UE to use while in the inactive mode or the idle mode, wherein the timing advance command corresponds to first set of values for one or more channel metrics associated with the UE and associated with one or more cells including a serving cell for the UE.

Aspect 27: The method of aspect 26, further comprising transmitting a second timing advance command to the UE, the second timing advance command indicating a second timing advance for the UE to use while in the inactive mode or the idle mode, wherein the second timing advance command corresponds to second set of values for one or more channel metrics associated with the UE and associated with one or more cells including the serving cell for the UE.

Aspect 28: The method of aspect 27, further comprising receiving, based at least in part on the monitoring, the one or more multicast feedback messages according to the timing advance based at least in part on a set of channel metrics at the UE satisfying the first set of values or according to the second timing advance based at least in part on a set of channel metrics at the UE satisfying the second set of values.

Aspect 29: An apparatus for wireless communications at a UE, comprising a processor; memory coupled with the processor; and instructions stored in the memory and executable by the processor to cause the apparatus to perform a method of any of aspects 1 through 19.

Aspect 30: An apparatus for wireless communications at a UE, comprising at least one means for performing a method of any of aspects 1 through 19.

Aspect 31: A non-transitory computer-readable medium storing code for wireless communications at a UE, the code comprising instructions executable by a processor to perform a method of any of aspects 1 through 19.

Aspect 32: An apparatus for wireless communications at a base station, comprising a processor; memory coupled with the processor; and instructions stored in the memory and executable by the processor to cause the apparatus to perform a method of any of aspects 20 through 28.

Aspect 33: An apparatus for wireless communications at a base station, comprising at least one means for performing a method of any of aspects 20 through 28.

Aspect 34: A non-transitory computer-readable medium storing code for wireless communications at a base station, the code comprising instructions executable by a processor to perform a method of any of aspects 20 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an application specific integrated circuit (ASIC), a central processing unit (CPU), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a base station, one or more configurations for the UE to use, while in an inactive mode or an idle mode, to provide feedback associated with multicast transmissions from the base station;
   monitoring, while in the inactive mode or the idle mode, a set of time frequency resources configured for the multicast transmissions from the base station;
   transmitting, while in the inactive mode or the idle mode, one or more multicast feedback messages in accordance with the one or more configurations based at least in part on the monitoring; and
   transmitting a reception status report that indicates a ratio of a quantity of received physical control channels for the multicast transmissions to a total quantity of physical control channels for the multicast transmissions scheduled over a set of monitoring occasions, the reception status report being transmitted on a set of uplink resources associated with the ratio.

2. The method of claim 1, further comprising determining a set of random access channel resources available for multicast feedback based at least in part on a resource allocation indicated by the one or more configurations, wherein transmitting the one or more multicast feedback messages comprises transmitting the one or more multicast feedback messages via the set of random access channel resources.

3. The method of claim 1, further comprising:
   determining a set of random access channel preambles available for multicast feedback based at least in part on a resource allocation indicated by the one or more configurations; and
   selecting a preamble of the set of random access channel preambles, wherein transmitting the one or more multicast feedback messages comprises transmitting the one or more multicast feedback messages using the selected preamble.

4. The method of claim 3, further comprising receiving a multicast message over the set of time frequency resources based at least in part on the monitoring, wherein selecting the preamble of the set of random access channel preambles comprises selecting the preamble based at least in part on a channel quality metric associated with the received multicast message.

5. The method of claim 1, further comprising:
   receiving a multicast message over the set of time frequency resources based at least in part on the monitoring;
   transmitting channel quality information associated with the received multicast message, wherein the channel quality information comprises one or more of reference signal received power, beam direction, beam width, geographical location, or altitude and azimuth values associated with one or more beams; and
   determining time frequency resources for multicast feedback based at least in part on the channel quality information, wherein transmitting the one or more multicast feedback messages comprises transmitting the one or more multicast feedback messages via the determined time frequency resources.

6. The method of claim 1, further comprising determining a resource pool available for multicast feedback based at least in part on the one or more configurations, wherein transmitting the one or more multicast feedback messages comprises transmitting the one or more multicast feedback messages using a subset of time frequency resources of the resource pool.

7. The method of claim 1, further comprising determining a set of physical uplink control channel resources available for multicast feedback based at least in part on the one or more configurations, wherein transmitting the one or more multicast feedback messages comprises transmitting the one or more multicast feedback messages using a subset of the physical uplink control channel resources.

8. The method of claim 7, further comprising:
   determining an uplink control format for the one or more multicast feedback messages; and
   padding a payload of the one or more multicast feedback messages based at least in part on a size associated with the uplink control format.

9. The method of claim 1, further comprising receiving a timing advance command from the base station, the timing advance command indicating a timing advance for the UE to use while in the inactive mode or the idle mode, wherein the timing advance command corresponds to first set of values for one or more channel metrics associated with the UE and associated with one or more cells including a serving cell for the UE.

10. The method of claim 9, further comprising receiving a second timing advance command from the base station, the second timing advance command indicating a second timing advance for the UE to use while in the inactive mode or the idle mode, wherein the second timing advance command corresponds to second set of values for one or more channel metrics associated with the UE and associated with one or more cells including the serving cell for the UE.

11. The method of claim 10, further comprising measuring a set of channel metrics of the one or more cells including the serving cell, wherein transmitting the one or more multicast feedback messages comprises transmitting the one or more multicast feedback messages using the timing advance based at least in part on the set of channel metrics satisfying the first set of values or using the second timing advance based at least in part on the set of channel metrics satisfying the second set of values.

12. The method of claim 10, wherein the one or more channel metrics comprise one or more of a reference signal received power, a relative delay between the serving cell and one or more other cells, or a positioning range of the UE.

13. The method of claim 10, further comprising receiving one or more of the timing advance command or the second timing advance command in the one or more configurations, the one or more configurations indicating a set of uplink resources for multicast feedback, wherein transmitting the one or more multicast feedback messages comprises transmitting the one or more multicast feedback messages using the set of uplink resources.

14. The method of claim 9, further comprising receiving a set of neural network parameters in the timing advance command from the base station, wherein the set of neural network parameters indicate the timing advance.

15. The method of claim 1, further comprising:
receiving, at the UE while in a connected mode, a neural network model and a set of neural network parameters from the base station, the neural network model and the set of neural network parameters being associated with a neural network for a timing advance;
receiving one or more neural network parameters from the base station; and
determining the timing advance based at least in part on the neural network model, the set of neural network parameters, and the one or more neural network parameters, wherein transmitting the one or more multicast feedback messages comprises transmitting, by the UE while in the inactive mode or the idle mode, the one or more multicast feedback messages based at least in part on the timing advance.

16. The method of claim 1, further comprising:
receiving a broadcast message from the base station indicating a counting duration for a service of the multicast transmissions supported by the base station; and
transmitting a service request message over the counting duration requesting the service of the multicast transmissions supported by the base station based at least in part on an identifier of the UE.

17. The method of claim 16, further comprising receiving, from the base station, a probability indicator for the UE, wherein transmitting the service request message comprises transmitting the message in accordance with the probability indicator.

18. A method for wireless communications at a base station, comprising:
transmitting, to a user equipment (UE), one or more configurations for multicast feedback for use by the UE while in an inactive mode or an idle mode;
transmitting one or more multicast transmissions via a set of time frequency resources configured for multicast communications; and
monitoring, based at least in part on transmitting the one or more multicast transmissions, for one or more multicast feedback messages from the UE in accordance with the one or more configurations; and
receiving a reception status report from the UE that indicates a ratio of a quantity of physical control channels received by the UE for the multicast transmissions to a total quantity of physical control channels for the multicast transmissions scheduled over a set of monitoring occasions, the reception status report being received on a set of uplink resources associated with the ratio.

19. The method of claim 18, further comprising:
transmitting an indication of a set of random access channel resources available for multicast feedback in the one or more configurations; and
monitoring the set of random access channel resources for the one or more multicast feedback messages.

20. The method of claim 18, further comprising:
transmitting an indication of a set of random access channel preambles available for multicast feedback in the one or more configurations; and
monitoring for the one or more multicast feedback messages based at least in part on the set of random access channel preambles.

21. The method of claim 18, further comprising:
receiving, from the UE, channel quality information associated with a multicast channel used for multicast communications with the UE, wherein the channel quality information comprises one or more of reference signal received power, beam direction, beam width, geographical location, or altitude and azimuth values associated with one or more beams;
determining a resource pool for multicast feedback for the UE based at least in part on the channel quality information; and
transmitting an indication of the resource pool in the one or more configurations.

22. The method of claim 21, further comprising receiving the one or more multicast feedback messages via a subset of time frequency resources of the resource pool based at least in part on the monitoring.

23. The method of claim 18, further comprising:
transmitting an indication of a set of physical uplink control channel resources available for multicast feedback in the one or more configurations; and
monitoring the set of physical uplink control channel resources for the one or more multicast feedback messages.

24. The method of claim 18, further comprising transmitting a timing advance command to the UE, the timing advance command indicating a timing advance for the UE to use while in the inactive mode or the idle mode, wherein the timing advance command corresponds to first set of values for one or more channel metrics associated with the UE and associated with one or more cells including a serving cell for the UE.

25. The method of claim 24, further comprising transmitting a second timing advance command to the UE, the second timing advance command indicating a second timing advance for the UE to use while in the inactive mode or the idle mode, wherein the second timing advance command corresponds to second set of values for one or more channel metrics associated with the UE and associated with one or more cells including the serving cell for the UE.

26. The method of claim 25, further comprising receiving, based at least in part on the monitoring, the one or more multicast feedback messages according to the timing advance based at least in part on a set of channel metrics at the UE satisfying the first set of values or according to the second timing advance based at least in part on a set of channel metrics at the UE satisfying the second set of values.

27. An apparatus for wireless communications at a user equipment (UE), comprising:
   a processor,
   memory coupled with the processor; and
   instructions stored in the memory and executable by the processor to cause the apparatus to:
      receive, from a base station, one or more configurations for the UE to use, while in an inactive mode or an idle mode, to provide feedback associated with multicast transmissions from the base station;
      monitor, while in the inactive mode or the idle mode, a set of time frequency resources configured for the multicast transmissions from the base station;
      transmit, while in the inactive mode or the idle mode, one or more multicast feedback messages in accordance with the one or more configurations based at least in part on the monitoring; and
      transmit a reception status report that indicates a ratio of a quantity of received physical control channels for the multicast transmissions to a total quantity of physical control channels for the multicast transmissions scheduled over a set of monitoring occasions, the reception status report being transmitted on a set of uplink resources associated with the ratio.

28. An apparatus for wireless communications at a base station, comprising:
   a processor,
   memory coupled with the processor; and
   instructions stored in the memory and executable by the processor to cause the apparatus to:
      transmit, to a user equipment (UE), one or more configurations for multicast feedback by the UE in an inactive mode or an idle mode;
      transmit one or more multicast transmissions via a set of time frequency resources configured for multicast communications; and
      monitor, based at least in part on transmitting the one or more multicast transmissions, for one or more multicast feedback messages from the UE in accordance with the one or more configurations; and
      receive a reception status report from the UE that indicates a ratio of a quantity of physical control channels received by the UE for the multicast transmissions to a total quantity of physical control channels for the multicast transmissions scheduled over a set of monitoring occasions, the reception status report being received on a set of uplink resources associated with the ratio.

\* \* \* \* \*